(12) United States Patent
Sekine et al.

(10) Patent No.: US 8,466,961 B2
(45) Date of Patent: Jun. 18, 2013

(54) APPARATUS AND METHOD FOR OUTPUTTING VIDEO IMAGES, AND PURCHASING SYSTEM

(75) Inventors: Masahiro Sekine, Kanagawa (JP); Yasunobu Yamauchi, Kanagawa (JP); Isao Mihara, Tokyo (JP); Yasukazu Higuchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1107 days.

(21) Appl. No.: 12/232,186

(22) Filed: Sep. 11, 2008

(65) Prior Publication Data
US 2009/0083814 A1    Mar. 26, 2009

(30) Foreign Application Priority Data

Sep. 25, 2007  (JP) ................................ 2007-247998

(51) Int. Cl.
    *H04N 7/18*    (2006.01)
(52) U.S. Cl.
    USPC ............ 348/143; 348/150; 348/152; 348/159
(58) Field of Classification Search
    USPC .................................................. 348/143–160
    See application file for complete search history.

(56) References Cited

U.S. PATENT DOCUMENTS

| | | | |
|---|---|---|---|
| 6,263,501 B1 | 7/2001 | Schein et al. |
| 6,389,424 B1 | 5/2002 | Kim et al. |
| 6,466,193 B1 | 10/2002 | Anai |
| 6,597,380 B1 | 7/2003 | Wang et al. |
| 6,628,313 B1 | 9/2003 | Minakuchi et al. |
| 6,646,980 B1 | 11/2003 | Yamamoto et al. |
| 6,665,668 B1 | 12/2003 | Sugaya et al. |
| 6,675,174 B1 | 1/2004 | Bolle et al. |
| 6,734,877 B1 | 5/2004 | Honda et al. |
| 6,745,205 B2 | 6/2004 | Choi et al. |
| 6,756,972 B2 | 6/2004 | Komatsu et al. |
| 6,816,551 B1 | 11/2004 | Kasutani |
| 6,853,374 B2 | 2/2005 | Iwasaki |
| 6,853,389 B1 | 2/2005 | Ikeda |
| 6,956,812 B2 | 10/2005 | Okada et al. |

(Continued)

FOREIGN PATENT DOCUMENTS

| | | |
|---|---|---|
| EP | 1 051 034 | 11/2000 |
| EP | 1 513 341 | 9/2005 |

(Continued)

OTHER PUBLICATIONS

Yamauchi et al., U.S. Appl. No. 12/049,455, filed Mar. 17, 2008.

(Continued)

*Primary Examiner* — Andy Rao
(74) *Attorney, Agent, or Firm* — Nixon & Vanderhye, P.C.

(57) ABSTRACT

The video input unit inputs video data. The reference data input unit inputs a plurality of reference data relating to the video data. The extraction condition determining unit determines, from the identification information of the plurality of reference data, an item of identification information in correspondence with a period of time elapsed after receipt of an output request. The reference data extracting unit extracts the reference data having the determined identification information. The analyzing unit calculates the level of similarity between the frames in the input video data and the reference data, and extracts frames whose level of similarity is greater than a first threshold value. The video generating unit generates output video data that includes the extracted frames. The output unit outputs the generated output video data.

18 Claims, 20 Drawing Sheets

U.S. PATENT DOCUMENTS

| | | | |
|---|---|---|---|
| 7,171,344 B2 | 1/2007 | Lind | |
| 7,213,206 B2 | 5/2007 | Fogg | |
| 7,245,677 B1 | 7/2007 | Pare, Jr. | |
| 7,281,054 B2 | 10/2007 | Ishioka et al. | |
| 7,298,384 B2 | 11/2007 | Anabuki et al. | |
| 7,333,096 B2 | 2/2008 | Washio et al. | |
| 7,369,142 B2 | 5/2008 | Kondo et al. | |
| 7,421,455 B2 | 9/2008 | Hua et al. | |
| 7,519,121 B2 | 4/2009 | Matsushita et al. | |
| 7,519,685 B2 | 4/2009 | Nonaka et al. | |
| 7,557,774 B2 | 7/2009 | Baudisch et al. | |
| 7,557,865 B2 | 7/2009 | Minami | |
| 7,590,948 B2 | 9/2009 | Narita et al. | |
| 7,607,150 B1 | 10/2009 | Kobayashi et al. | |
| 7,805,022 B2 | 9/2010 | Tanaka | |
| 7,840,892 B2 | 11/2010 | Pyhalammi et al. | |
| 7,930,634 B2 | 4/2011 | Nakamura | |
| 7,940,285 B2 | 5/2011 | Would et al. | |
| 8,002,633 B2 | 8/2011 | Shimizu | |
| 8,041,155 B2 | 10/2011 | Mihara et al. | |
| 8,174,523 B2 | 5/2012 | Higuchi et al. | |
| 8,244,738 B2 | 8/2012 | Higuchi et al. | |
| 2001/0007980 A1 | 7/2001 | Ishibashi et al. | |
| 2001/0031129 A1 | 10/2001 | Tajima | |
| 2001/0035855 A1 | 11/2001 | Komatsu et al. | |
| 2002/0055924 A1* | 5/2002 | Liming | 707/100 |
| 2002/0057294 A1 | 5/2002 | Ejima et al. | |
| 2002/0145603 A1 | 10/2002 | Iwasaki | |
| 2003/0046694 A1 | 3/2003 | Istvan et al. | |
| 2003/0103675 A1 | 6/2003 | Endo et al. | |
| 2003/0122773 A1 | 7/2003 | Washio et al. | |
| 2003/0142115 A1 | 7/2003 | Endo et al. | |
| 2004/0172410 A1 | 9/2004 | Shimojima et al. | |
| 2005/0010599 A1 | 1/2005 | Kake et al. | |
| 2005/0055639 A1 | 3/2005 | Fogg | |
| 2005/0076361 A1 | 4/2005 | Choi et al. | |
| 2005/0097606 A1 | 5/2005 | Scott et al. | |
| 2005/0138564 A1 | 6/2005 | Fogg | |
| 2005/0193408 A1 | 9/2005 | Sull et al. | |
| 2005/0210410 A1 | 9/2005 | Ohwa et al. | |
| 2005/0212726 A1 | 9/2005 | Namba et al. | |
| 2006/0064716 A1 | 3/2006 | Sull et al. | |
| 2006/0086022 A1 | 4/2006 | Would et al. | |
| 2006/0150215 A1 | 7/2006 | Wroblewski | |
| 2007/0027855 A1 | 2/2007 | Kagawa | |
| 2007/0106661 A1 | 5/2007 | Narita et al. | |
| 2007/0106949 A1 | 5/2007 | Narita et al. | |
| 2007/0107015 A1 | 5/2007 | Kazama et al. | |
| 2007/0112940 A1 | 5/2007 | Morisawa et al. | |
| 2007/0130318 A1 | 6/2007 | Roast | |
| 2007/0136755 A1 | 6/2007 | Sakai | |
| 2007/0252822 A1 | 11/2007 | Kim et al. | |
| 2008/0074985 A1 | 3/2008 | Mukaiyama et al. | |
| 2008/0136837 A1 | 6/2008 | Iguchi | |
| 2008/0215548 A1 | 9/2008 | Ohashi et al. | |
| 2008/0235729 A1 | 9/2008 | Doi et al. | |
| 2008/0267582 A1 | 10/2008 | Yamauchi | |
| 2008/0316229 A1 | 12/2008 | Terayoko | |
| 2008/0316518 A1 | 12/2008 | Watari et al. | |
| 2009/0019031 A1 | 1/2009 | Krovitz et al. | |
| 2009/0022480 A1 | 1/2009 | Yabe | |
| 2009/0025030 A1 | 1/2009 | Kasutani | |
| 2009/0080698 A1 | 3/2009 | Mihara et al. | |
| 2009/0083814 A1 | 3/2009 | Sekine et al. | |
| 2009/0228800 A1 | 9/2009 | Yasuda | |
| 2009/0262139 A1 | 10/2009 | Tanaka et al. | |
| 2010/0050098 A1 | 2/2010 | Turner | |
| 2010/0054703 A1 | 3/2010 | Tanaka et al. | |
| 2010/0057696 A1 | 3/2010 | Miyazawa et al. | |
| 2010/0057722 A1 | 3/2010 | Nakamura et al. | |
| 2010/0058173 A1 | 3/2010 | Kizuka et al. | |
| 2010/0058213 A1 | 3/2010 | Higuchi et al. | |
| 2010/0058388 A1 | 3/2010 | Baba et al. | |
| 2010/0156893 A1 | 6/2010 | Mihara et al. | |
| 2010/0229126 A1 | 9/2010 | Mihara et al. | |
| 2010/0302595 A1 | 12/2010 | Yamada et al. | |
| 2010/0333140 A1 | 12/2010 | Onodera et al. | |
| 2011/0083552 A1 | 4/2011 | Vicars | |
| 2011/0252447 A1 | 10/2011 | Suzuki et al. | |
| 2012/0266192 A1 | 10/2012 | Crew et al. | |

FOREIGN PATENT DOCUMENTS

| | | |
|---|---|---|
| EP | 1 785 814 | 5/2007 |
| EP | 2 159 713 | 3/2010 |
| EP | 2 159 722 | 3/2010 |
| EP | 2 160 032 | 3/2010 |
| EP | 2 166 752 | 3/2010 |
| JP | 09-219835 | 8/1997 |
| JP | 09-259130 | 10/1997 |
| JP | 11-003346 | 1/1999 |
| JP | 11-175534 | 7/1999 |
| JP | 11-249774 | 9/1999 |
| JP | 2000-076267 | 3/2000 |
| JP | 2000-242648 | 9/2000 |
| JP | 2000-305946 | 11/2000 |
| JP | 2001-175380 | 6/2001 |
| JP | 2001-186497 | 7/2001 |
| JP | 2001-285787 | 10/2001 |
| JP | 2001-292383 | 10/2001 |
| JP | 2001-326881 | 11/2001 |
| JP | 2002-175269 | 6/2002 |
| JP | 2002-175321 | 6/2002 |
| JP | 2002-209178 | 7/2002 |
| JP | 2003-085884 | 3/2003 |
| JP | 2003-167914 | 6/2003 |
| JP | 2003-330969 | 11/2003 |
| JP | 2004-178085 | 6/2004 |
| JP | 2004-178384 | 6/2004 |
| JP | 2004-258390 | 9/2004 |
| JP | 2005-010854 | 1/2005 |
| JP | 2005-080247 | 3/2005 |
| JP | 2005-267390 | 9/2005 |
| JP | 2005-303741 | 10/2005 |
| JP | 2006-094520 | 4/2006 |
| JP | 2006-129122 | 5/2006 |
| JP | 2006-260178 | 9/2006 |
| JP | 2007-034663 | 2/2007 |
| JP | 2007-049502 | 2/2007 |
| JP | 2007-066285 | 3/2007 |
| JP | 2007-122496 | 5/2007 |
| JP | 2007-148669 | 6/2007 |
| JP | 2007-149313 | 6/2007 |
| JP | 2007-249641 | 9/2007 |
| JP | 2007-272651 | 10/2007 |
| JP | 2007-281945 | 10/2007 |
| JP | 2007-311892 | 11/2007 |
| JP | 2008-004985 | 1/2008 |
| JP | 2008-077774 | 4/2008 |
| JP | 2008-078785 | 4/2008 |
| JP | 2008-129942 | 6/2008 |
| JP | 2008-130032 | 6/2008 |
| JP | 2008-134725 | 6/2008 |
| JP | 2008-242504 | 10/2008 |
| JP | 2008-270872 | 11/2008 |
| JP | 2009-080580 | 4/2009 |
| WO | 00/33572 | 6/2000 |
| WO | 2004/091216 | 10/2004 |

OTHER PUBLICATIONS

Mihara et al., U.S. Appl. No. 12/076,439, filed Mar. 18, 2008.
Tanaka et al., U.S. Appl. No. 12/416,786, filed Apr. 1, 2009.
Kizuka et al., U.S. Appl. No. 12/418,474, filed Apr. 3, 2009.
Baba et al., U.S. Appl. No. 12/426,756, filed Apr. 20, 2009.
Miyazawa et al., U.S. Appl. No. 12/431,663, filed Apr. 28, 2009.
Nakamura et al., U.S. Appl. No. 12/461,761, filed Aug. 24, 2009.
Higuchi et al., U.S. Appl. No. 12/461,924, filed Aug. 27, 2009.
Higuchi et al., U.S. Appl. No. 12/585,269, filed Sep. 9, 2009.
Mihara et al., U.S. Appl. No. 12/585,458, filed Sep. 15, 2009.
Yoshiyuki Kokojima et al., "Resolution Independent Rendering of Deformable Vector Objects Using Graphics Hardware", Sketches, Siggraph, (2006).
Masaru Suzuki et al., "Sasatto Search" Human Interface Technology for Information Retrieval, Toshiba Review vol. 62, No. 12, 2007, pp. 54-57.

Huan-Bo Luan et al., Interactive Spatio-Temporal Visual Map Model Web Video Retrieval, Multimedia and Expo, 2007, IEEE International Conference on,IEEE, P1, Jul. 1, 2007, pp. 560-563, ISBN: 978-1-4244-1016-3. (Abstract).

Loviscach, "Motion Blur for Textures by Means of Anisotropic Filtering," Eurographics Symposium on Rendering (2005), pp. 105-110.

Takeuchi et al., "Motion sharpening in moving natural images," Journal of Vision (2002), 2:377 (Abstract).

Brostow et al., "Image-Based Motion Blur for Stop Motion Animation", Proc. of Siggraph '01, pp. 561-566, (2001).

Ramos, et al., "Fluid Interaction Techniques for the Control and Annotation of Digital Video", Proceedings of the 16th annual ACM Symposium on User Interface Software and Technology, vol. 5, Issue 2, pp. 105-114, (2003).

Irani et al., "Efficient Representations of Video Sequence and Their Applications", Signal processing Image Communication (Journal), pp. 1-39, (1996).

Teodosio et al., "Salient Stills", ACM Transaction on Multimedia Computing, Communications and Appllications, pp. 16-36, (2005).

Agarwala et al., "Interactive Digital Photomontage", ACM Siggraph, pp. 1-9, (2004).

U.S. Appl. No. 12/076,439.

U.S. Appl. No. 12/049,455.

Office Action dated Jul. 24, 2012 in JP Application No. 2007-247998 with English-language translation.

Mihara et al., U.S. Appl. No. 12/659,276, filed Mar. 2, 2010.

Shimizu et al., U.S. Appl. No. 13/110,279, filed May 18, 2011.

\* cited by examiner

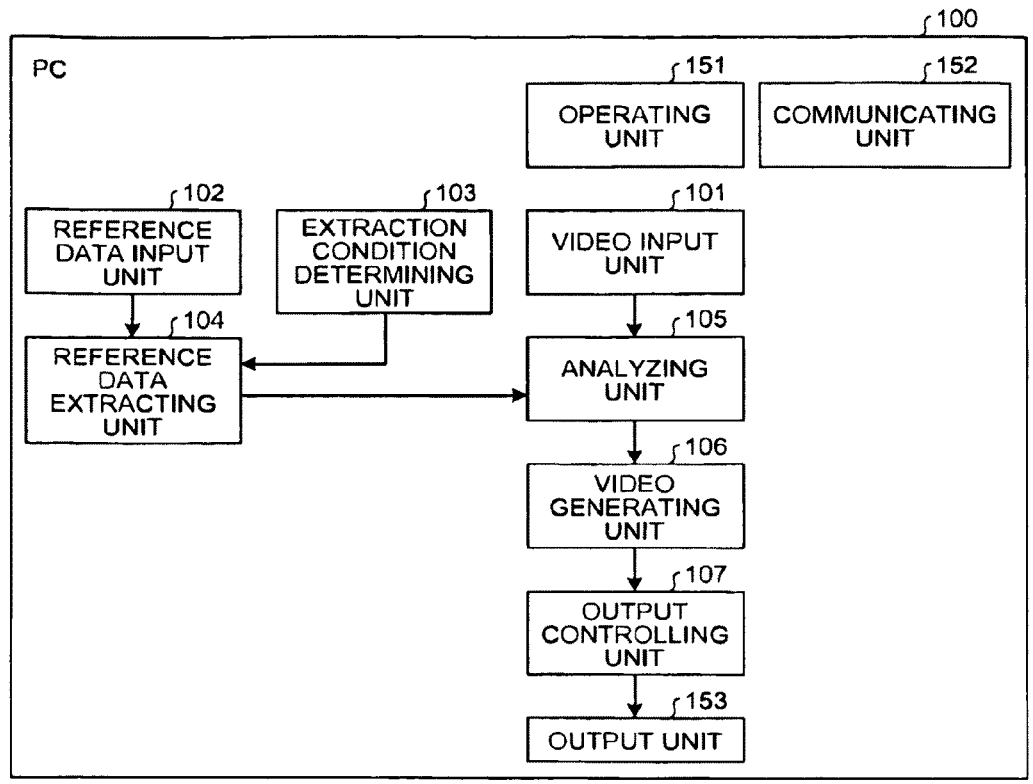
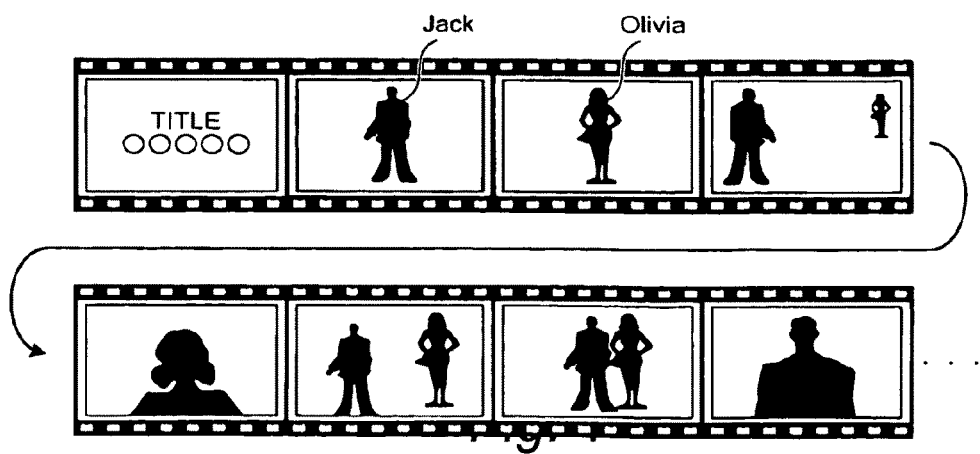

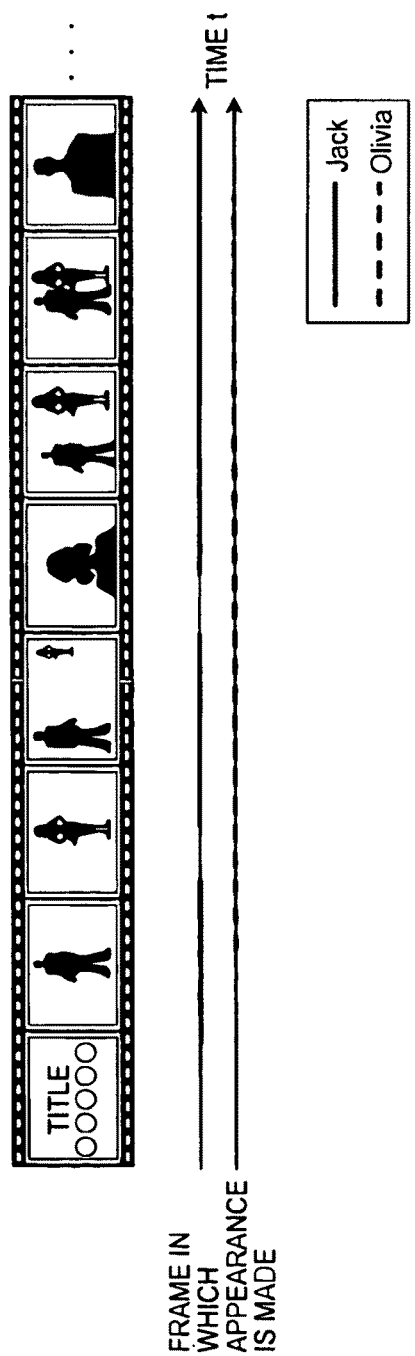

FIG.20

| CONSTRAINT | OUTPUT VIDEO DATA GENERATION CONDITION |
|---|---|
| DISPLAY SCREEN SIZE = 42 INCHES, RESOLUTION = 1920 X 1080 PIXELS | LAYOUT 4-1 |
| : | : |
| GENRE = LANDSCAPE OF NATURE | LAYOUT 1-1 |
| : | : |

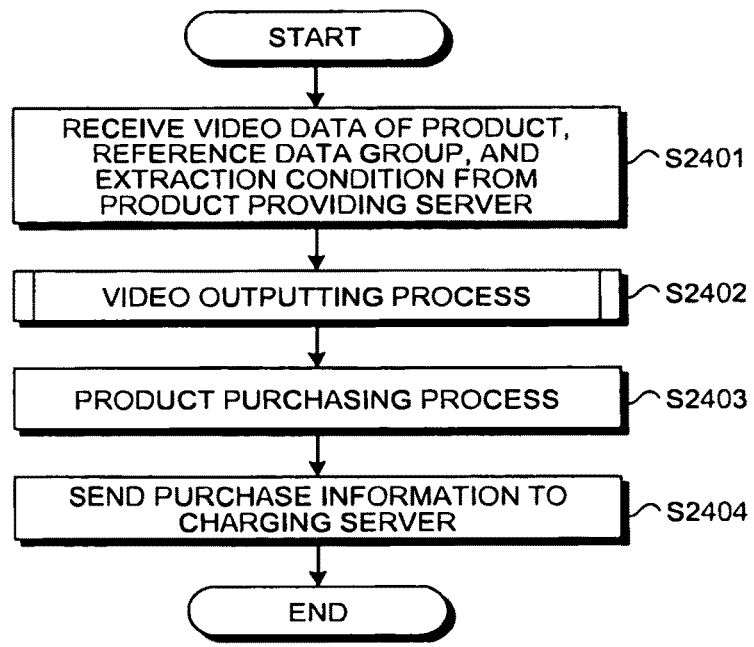
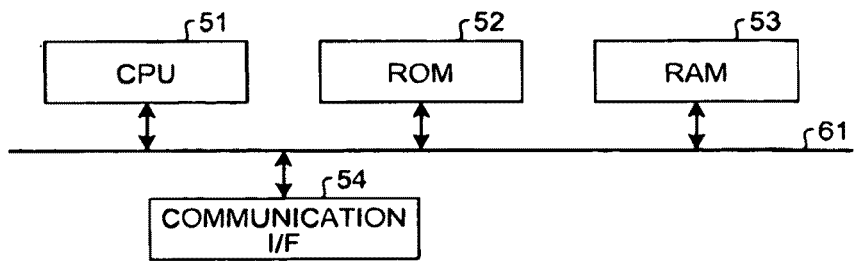

APPARATUS AND METHOD FOR OUTPUTTING VIDEO IMAGES, AND PURCHASING SYSTEM

CROSS-REFERENCE TO RELATED APPLICATIONS

This application is based upon and claims the benefit of priority from the prior Japanese Patent Application No. 2007-247998, filed on Sep. 25, 2007; the entire contents of which are incorporated herein by reference.

BACKGROUND OF THE INVENTION

1. Field of the Invention

The present invention relates to an apparatus and a method for outputting video data generated by extracting an item of video data that is to be viewed from among multiple items of video data, and a purchasing system.

2. Description of the Related Art

Recently, the use of broadband connections for communication networks has spread, and high-quality TV broadcasting has increased. In addition, digital camcorders have been commoditized. In accordance with such technological changes, users have been dealing with massive amounts of video data. Such data often includes redundant image data for some users, which makes it difficult to search for video data that the users wish to view from among an enormous amount of data that includes redundant data or to promptly understand what the content of the video data is.

As a solution to such a problem, a technique of listing the contents of the image data has been widely used, in which representative images of the video data, called thumbnails, are displayed. In a simple video data displaying method, the leading frame of the video data is extracted, and the data of the leading frame is reduced to create a thumbnail and displayed to show the content of the video data.

The leading frame, however, may not be the most suitable frame to characterize the content of the video data. Then, the user often does not fully understand the content of the video data by viewing the thumbnail image only.

A technology has been therefore suggested, in which a thumbnail is created and displayed by combining the leading frame of the video data with text data (by JP-A 2002-209178 (KOKAI), for example). As time progresses, it tends to become more difficult to understand the content of the video data from the leading frame only, and the technology is meant to solve such a problem. With this technology, a title image including text data such as the title of a program, performers, recording date and time is combined with the image of the leading frame, which realizes a displaying method that solves the problem and enables the user to easily understand the video data.

A technology of analyzing the video data and thereby selecting and displaying an image that characterizes the video image has also been suggested (by JP-A H11-3346 (KOKAI), for example). With this technology, candidates for representative images are extracted by use of a function of detecting where scenes of the video data change, and manually selecting a representative image to display from the candidate images. A thumbnail can be effectively displayed by selecting an image that the user considers as the most suitable from candidates that have been narrowed down to a certain number of images.

Furthermore, a technology of creating a thumbnail in accordance with the type of video data has been suggested (by JP-A H9-219835 (KOKAI), for example). Because different types of video data, such as films, news programs, and TV commercials, have different properties and structures, the video is divided into segments and images are extracted and combined, in different manners according to the types of video data. With such a method, a suitable thumbnail can be created for each type of video data, and the thumbnail can be effectively displayed.

The above technologies, however, have a drawback that images selected or created according to certain judgment criteria only are displayed. For example, JP-A 2002-209178 (KOKAI) discloses a method of displaying a thumbnail image created by combining the image of the leading frame with a title image that includes text data such as the title of the program. In other words, when the same video data is dealt with, the same thumbnail image determined in accordance with the method of the technology is displayed for different users or for different viewing situations. For this reason, images are not created or displayed in consideration of each user's preference or situation.

SUMMARY OF THE INVENTION

According to one aspect of the present invention, a video outputting apparatus includes a video input unit that inputs video data; a reference data input unit that inputs a plurality of reference data formed from at least one of image data, text data, and speech data related to the input video data; a determining unit that determines identification information corresponding to predetermined variable information that changes dynamically and includes an elapsed time elapsed after receipt of an output request of the output video data, from among identification information for the plurality of reference data in accordance with a predetermined rule; a reference data extracting unit that extracts the reference data corresponding to the identification information determined from the plurality of reference data; a frame extracting unit that calculates at least one of a level of similarity between frames in the input video data and the image data extracted as the reference data, a level of similarity between text data attached to the frames as metadata and the text data extracted as the reference data, and a level of similarity between speech data attached to the frames and the speech data extracted as the reference data, and extracts a frame whose calculated level of similarity is greater than a predetermined first threshold value or a frame to which speech data whose calculated level of similarity is greater than the first threshold value is attached; a video generating unit that generates the output video data including the frame extracted by the frame extracting unit; and an output unit that outputs the output video data generated by the video generating unit.

According to another aspect of the present invention, a video outputting method is performed in a video outputting apparatus that generates and outputs output video data including frames extracted from input video data.

The video outputting method includes inputting video data; inputting a plurality of reference data formed from at least one of image data, text data, and speech data related to the input video data; determining identification information corresponding to predetermined variable information that changes dynamically and includes an elapsed time elapsed after receipt of an output request of the output video data, from among identification information for the plurality of reference data in accordance with a predetermined rule; extracting the reference data corresponding to the identification information determined from the plurality of reference data; calculating at least one of a level of similarity between frames in the input video data and the image data extracted as the reference data, a level of similarity between text data attached to the frames as metadata and the text data extracted as the reference data, and a level of similarity between speech data attached to the frames and the speech data extracted as the reference data; extracting a frame whose calculated level of similarity is greater than a predetermined first threshold value or a frame to which speech data whose calculated level of similarity is greater than the first threshold value is attached; generating the output video data including the extracted frame; and outputting the generated output video data.

According to still another aspect of the present invention, a purchasing system includes a providing apparatus that provides video data related to a product; a charging apparatus that executes a charging process onto a provider of the product in accordance with purchase information of the purchased product; and a video outputting apparatus that generates and outputs output video data including frames extracted from input video data.

The video outputting apparatus includes a video input unit that inputs video data, a reference data input unit that inputs a plurality of reference data formed from at least one of image data, text data, and speech data related to the input video data, a determining unit that determines identification information corresponding to predetermined variable information that changes dynamically and includes an elapsed time elapsed after receipt of an output request of the output video data, from among identification information for the plurality of reference data in accordance with a predetermined rule, a reference data extracting unit that extracts the reference data corresponding to the identification information determined from the plurality of reference data, a frame extracting unit that calculates at least one of a level of similarity between frames in the input video data and the image data extracted as the reference data, a level of similarity between text data attached to the frames as metadata and the text data extracted as the reference data, and a level of similarity between speech data attached to the frames and the speech data extracted as the reference data, and extracts a frame whose calculated level of similarity is greater than a predetermined first threshold value or a frame to which speech data whose calculated level of similarity is greater than the first threshold value is attached, a video generating unit that generates the output video data including the frame extracted by the frame extracting unit, an output unit that outputs the output video data generated by the video generating unit, a purchase processing unit that executes a process relating to a purchase of the product designated with reference to the output video data output by the output unit, and a charging processing unit that transmits to the charging apparatus the purchase information related to the product purchased on the purchase processing unit.

BRIEF DESCRIPTION OF THE DRAWINGS

FIG. 1 is a block diagram of a video outputting apparatus according to a first embodiment;
FIG. 2 is a diagram for showing an example of input video data;
FIG. 3 is a schematic diagram for showing an example of a video index;
FIG. 20 is a diagram for explaining an example of a data structure of association information stored in an association information storage unit;
FIG. 24 is a flowchart of a video outputting process according to the fourth embodiment;
and
FIG. 25 is a diagram for explaining a hardware structure of the video outputting apparatus according to the first to fourth embodiments.

DETAILED DESCRIPTION OF THE INVENTION

Figure 4:
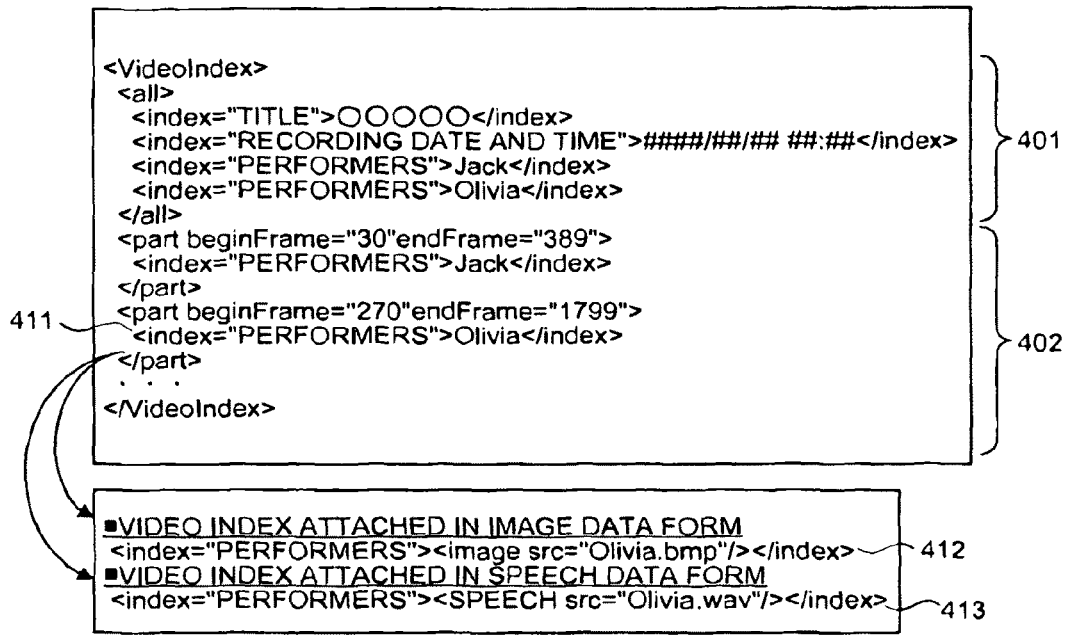
FIG. 4 is a diagram for showing an example of description of the video index.

Exemplary embodiments of an apparatus, a method, and a system according to the present invention are explained below with reference to the attached drawings.

A video outputting apparatus according to a first embodiment extracts frames from video data by use of reference data extracted in accordance with extraction conditions from a reference data group related to the video data, and creates and displays output video data that includes the extracted frames.

The video data mentioned here denotes data that is formed of at least one video frame. In other words, the video data includes moving image data and still image data. The reference data includes video data different from the input video data, text data including character strings and numerals, and speech data. The reference data is referred to when creating output video data from the video data. A reference data group includes a set of reference data items, from which one reference data item or more can be extracted in accordance with an extraction condition.

In the following description, video data that is to be output is referred to as output video data. The output video data may be formed of still image data only, moving image data only, or a combination of the two kinds of image data.

The following explanation focuses on the video outputting apparatus that is realized as a general personal computer (PC). An applicable device is not limited to a PC, however. The device can be applied to any device that outputs video, such as a personal digital assistant (PDA), a cellular phone, a TV, and a video recorder.

Applicable data is not limited to video data, but music, homepage information on the Internet, electronic program (EPG) information, map information, and other various media can be equally adopted.

As illustrated in FIG. 1, the main hardware structure of a PC 100 includes an operating unit 151, a communicating unit 152, and an output unit 153. The main software structure of the PC 100 includes a video input unit 101, a reference data input unit 102, an extraction condition determining unit 103, a reference data extracting unit 104, an analyzing unit 105, a video generating unit 106, and an output controlling unit 107.

The operating unit 151 receives an operation input by a user. More specifically, the operating unit 151 can be formed of a keyboard, a mouse, a remote control, a touch panel, and the like. The user designates an extraction condition by use of the operating unit 151, while checking various video data, the input reference data, and extraction conditions displayed on the output unit 153, which will be described later.

The communicating unit 152 transmits and receives data via a not-shown network to and from an external device. The communicating unit 152 includes an interfacing function that corresponds to the form of a network in use, such as a wired local-area network (LAN), a wireless LAN, and Bluetooth. With this interfacing function, the communicating unit 152 can receive video data recommended by other users, reference data, extraction conditions, and the like.

The output unit 153 outputs the output video data generated by the video generating unit 106 that will be discussed later. For example, the output unit 153 may be formed of a general display device. The output unit 153 may also be formed of a printer that outputs the video data as a printout.

The video input unit 101 inputs video data to which tag information (metadata) indicating the content of the video is attached in advance, or one video data item or more to which no tag information is attached. The video input unit 101 may input any type of video data, such as a TV program recorded by a video recorder, an on-air TV program, video data taken by a camcorder or a video camera-equipped cellular phone, an image taken by a digital camera or a camera-equipped cellular phone, video data distributed on the Internet, films, and video data created or edited on an external PC.

In the example of FIG. 2, the video data is formed of multiple frames in which two people, Jack and Olivia, appear.

Video data in general denotes data having a video content only. Recently, however, most video data is provided with tag information showing the attributes and structure of the video data, as defined by the technology of Moving Picture Experts Group (MPEG) 7.

In the following, the tag information attached to the video data is referred to as a video index. As mentioned above, the video input unit 101 can input video data with a video index attached thereto in advance, or video data without a video index. It should be noted, however, that the analyzing unit 105 can analyze video data more efficiently when a video index is attached to the data in advance, as discussed later.

A video index may pertain to the entire video data, a portion of the video data (frame group), or some frames of the video data.

The video index for the entire video data may include the title of the video data, the taking date and time, the recording date and time, the genre, people who appear in the video (performers), the average audience rating, the peak audience rating, the uniform resource locator (URL) information of a homepage introducing the video data, and the like.

The video index for a portion of the video (frame group) or for some of the frames may include the level of the sensation of the frames, people who appear (performers), the taking site, the taking date and time, the peak audience rating, information about products that appear in the video data (e.g. performers' clothes and bags), URL information of homepages introducing these products, and the like.

In FIG. 3, an example of a video index is visually presented in which the vide index is attached to indicate which frames (frame group) each of the two people in FIG. 2 appears.

In FIG. 4, an example of a video index described in the extensible Markup Language (XML) is given. The description style of the video index is not limited thereto, however. Any description style including other tag styles may be adopted.

In FIG. 4, set-up items 401 under the tag "all" relate to the video index for the entire video. Set-up items 402 under the tag "part" relate to the video index for a portion of the video or some frames of the video.

The video index for the entire video data shows that the title of the video data is "OOOOO", the recording (start) date and time is "month ## date ##, year ####, ##:## am/pm", and performers are Jack and Olivia.

The video index for a portion or some frames of the video shows that Jack appears in the 30th through 389th frames and that Olivia appears in the 270th through 1799th frames.

In relation to the people who appear in the data (performers), the video index may include not only the names of the people as text data, but also image data of the portraits of the people and speech data of the voices of the people. For example, instead of the name of the person "Olivia" stored as text data in a set-up item 411 of FIG. 4, the name of an image data file "Olivia.bmp" as in a set-up item 412 and the name of a speech data file "Olivia.wav" as in a set-up item 413 may be stored.

The video index may be supplied by a TV station broadcasting the TV program, automatically or manually attached by the user after the program is recorded, or obtained from information distributed on the Internet. If the formats of these video indexes differ, the video input unit 101 conducts a format conversion when the video data is input.

The video input unit 101 inputs video data of any format, such as MPEG2, MPEG4, and H.264. If more than one video data item is to be input, the video input unit 101 may be configured to attach identification information for identifying each video data item as a video index to the item. For example, IDs that show the inputting order or that are assigned in accordance with the order of priority at the time of outputting may be provided as video indexes.

Figure 5:
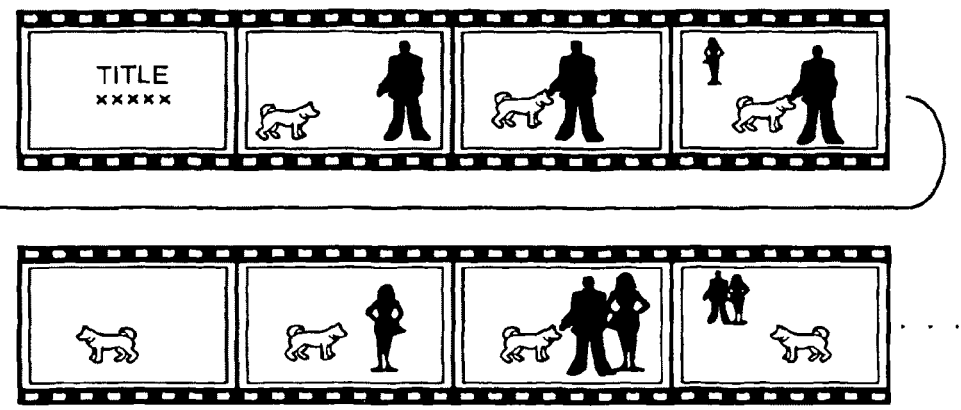
FIG. 5 is a diagram for showing an example of a video reference data group.

The reference data input unit 102 in FIG. 1 inputs a reference data group including multiple reference data items that are related to the input video data. FIG. 5 is a diagram for showing an example of a reference data group as video data having an array of images.

Figure 6:
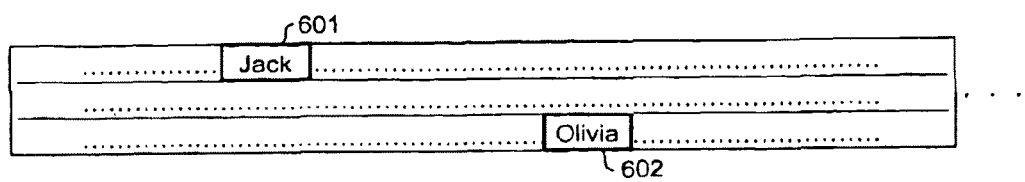
FIG. 6 is a diagram for showing an example of a text reference data group.

In FIG. 6, an example of a reference data group as text data is presented. A text 601 indicating the name of the person "Jack" and a text 602 indicating the name of the other person "Olivia" are included in the text data.

Figure 7:
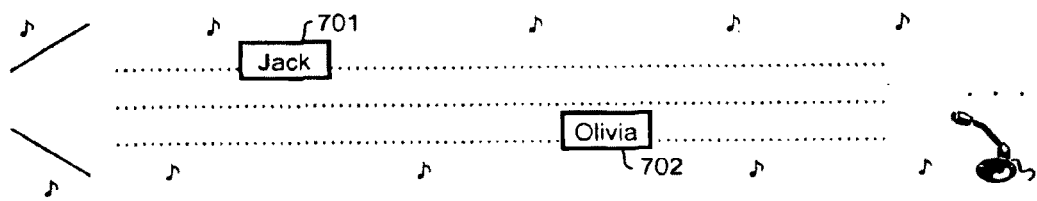
FIG. 7 is a diagram for showing an example of a speech reference data group.

In FIG. 7, an example of a reference data group as speech data is presented. A voice 701 indicating the name of the person "Jack" and a voice 702 indicating the name of the other person "Olivia" are included in the speech data.

In a similar manner to the video input unit 101, the reference data input unit 102 may input as reference data any type of video data, such as a TV program recorded by a video recorder, an on-air TV program, video data taken by a camcorder or a video camera-equipped cellular phone, an image taken by a digital camera or a camera-equipped cellular phone, video data distributed on the Internet, a movie picture, and video data created or edited on an external PC. Furthermore, the reference data input unit 102 may input as reference data a text of a book, the voice of a person reading the book, a text running on an electric bulletin board, or the name of a place indicated on a map.

The text data input by the reference data input unit 102 may be of any kind, and may be created or edited on an external PC or a cellular phone. Alternatively, the text data may be obtained from text data distributed on the Internet, from telop information adopted in a TV program or the like. Further, the text data may be obtained by use of an optical character recognition (OCR) function of an image scanner or the like, or converted from voice to a text by use of a speech recognition technology.

The speech data input by the reference data input unit 102 may be of any kind, and may be obtained from the user's natural speech, conversations on the telephone or cellular phone, speech data attached to the video data, speech data distributed on the Internet, speech data on the radio, music in a compact disk or the like, or speech effects.

If more than one reference data group is to be input, the reference data input unit 102 may be configured to assign identification information for identifying each reference data group. For example, IDs indicating the order of inputting or IDs assigned in accordance with the order of priority at the time of use may be given to the reference data groups.

In FIG. 1, the extraction condition determining unit 103 receives a request of outputting the output video data from the user, and determines in accordance with predetermined rules, a condition of extracting one reference data item or more from the reference data group input by the reference data input unit 102. The extraction condition may be designated as a list of addresses or a range of addresses, which are identification information for identifying the reference data item among the reference data group.

Examples of extraction conditions of extracting reference data as video data, text data, and speech data are now described.

When video data is extracted, frame numbers may be used as an extraction condition. A specific frame image can be extracted from the reference data group that includes video data by designating a frame number, and the extracted frame image can be adopted as the reference data.

Multiple frames can be extracted as video data by designating a range of frame numbers. Moreover, when the video data is divided into chapters, a chapter number, or a chapter number and a frame number counted from the leading frames of the chapter may be used as an extraction condition.

When text data is to be extracted and the text data is arranged in a table, for example, the numbers of a row and a column may be used as an extraction condition. If a regular text is input as a reference data group, the extraction condition may be numbers indicating "which sentence/phase/word, when counted from the beginning".

A specific word can be extracted from a reference data group that includes text data, by designating the number assigned to the word, and the extracted word can be used as reference data. Furthermore, multiple words can be extracted as reference data by designating the range of extraction (i.e., the number of words). In addition, extraction conditions do not always have to be determined in units of sentences, phrases, or words, but may be determined in a manner to extract nouns only, or verbs only.

When speech data is to be extracted and the speech source is mapped on a table or the like, the row and column numbers may be used as an extraction condition. When natural speech (e.g. book reading or conversations) is input as a reference data group, the input speech may be converted to text data by use of voice recognition and the word number may be designated as an extraction condition. In a similar manner as discussed above, any extraction condition can be adopted.

A specific word can be extracted from the reference data group having speech data, by designating the word number of the speech, and the extracted speech can be used as reference data. Furthermore, the utterance timing may be used as an extraction condition, with reference to the starting point of the speech data.

The method of the extraction condition determining unit 103 determining an extraction condition is now explained. The extraction condition determining unit 103 determines an extraction condition in accordance with a rule defining that a determination of an extraction condition should be made in correspondence with variable information that dynamically varies. The variable information may be a period of time that has elapsed since the process is initiated in response to a request for outputting the output video data. The rule may be that the next frame number of the video data is determined as an extraction condition after a certain period of time elapses.

The variable information is not limited to the above, however. Any information that dynamically varies can be adopted, such as the display position of the output video data, the user's viewing position, the loudness of the audience, and the temperature/humidity.

Different rules may be adopted in correspondence with the variable information. For example, when the display position of the output video data is used as variable information, the rule may be that the frame number determined as an extraction condition is incremented in accordance with the increasing coordinate value of the position at which the output video data is displayed.

Furthermore, when a temperature is used as variable information, the rule may be that the frame number corresponding to the temperature of the viewer's environment is determined as an extraction condition, by referring to information in which each temperature is associated with the frame number of a frame to be extracted. In this manner, the video data can be dynamically changed, depending on the season.

Dynamically changing information that is included in the reference data group can also be adopted for variable information. For example, shouts in the speech data that is attached to the video reference data may be used as variable information. Besides shouts, any attribute that determines the level of sensation and significance such as the peak audience rating of the video may be used as variable information.

The extraction condition determining unit 103 may be configured to change the occasions of determining the extraction condition, in accordance with the value of the variable information. For example, if the loudness of the audience is used as variable information, the intervals between the occasions for determining an extraction condition may be increased when the shout of the audience is at a high level, while the interval may be reduced when the shout is at a low level.

When the extraction condition determining unit 103 determines an extraction condition in accordance with the variable information, the frame number may be incremented as time passes. With the dynamically varying extraction condition, the reference data extracting unit 104 that is described later can dynamically change the video reference data from an image showing "Jack" to an image showing "Olivia".

When text data is input as a reference data group, the reference data extracting unit 104 can dynamically change the text reference data from a word "Jack" to "Olivia" by incrementing the word number of the word that appears in the text as time passes.

When speech data is input as a reference data group, for example, the reference data extracting unit 104 can dynamically change the speech reference data from the voice of "Jack" to the voice of "Olivia" by incrementing the word number of the word that appears in the speech as time passes.

The extraction condition determining unit 103 may also determine an extraction condition in response to the user's operation. For example, the extraction condition determining unit 103 may determine the frame number of the video data that is to be extracted as reference data in correspondence with the position of the user-operable slide bar that changes as the playback time of the video reference data proceeds. Moreover, the user may input a trigger by use of the operating unit 151 to cause the extraction condition determining unit 103 to update the extraction condition. For example, the user is allowed to give commands from the operating unit 151 to start the playback of the video data that has been input as the reference data group, to change frames that are to be extracted as reference data, and to stop the playback.

The reference data extracting unit 104 extracts one reference data item or more that matches the extraction condition from among the reference data group input by the reference data input unit 102. Because the extraction condition of extracting the reference data from the reference data group dynamically changes as described above, the reference data extracted by the reference data extracting unit 104 also dynamically changes.

According to the embodiment, it is assumed that a reference data group that includes reference data items related to the content that the user prefers to view is input. When, for example, the text data or speech data "Jack", or the video data showing Jack is extracted as reference data, this is understood as the user wishing to view a scene of the video data in which Jack appears.

When the text data or speech data "Olivia" or the video data in which Olivia appears is extracted as reference data, this is understood as the user wishing to view a scene of the video data in which Olivia appears.

Furthermore, the text data or speech data "Jack Olivia" or the video data in which both Jack and Olivia appear is extracted as reference data, this is understood as the user wishing to view a scene of the video data in which both Jack and Olivia appear.

The analyzing unit 105 analyzes the input video data and extracts frames that match the reference data extracted by the reference data extracting unit 104, as candidates of images that are to be included in the output video data.

For example, when the video index has a content as shown in FIG. 4 and text data "Olivia" is given as reference data, the analyzing unit 105 understands from the video index that the scene in which Olivia appears expands from the 270th frame to the 1799th frame. Thus, the analyzing unit 105 extracts the frame images of this segment as candidates of images to be included in the output video data.

When frames having the two people are attached as a video index as shown in FIG. 3 and "Jack" is provided as reference data, the analyzing unit 105 extracts groups of frames in which Jack appears, as indicated by solid lines. When "Olivia" is provided as reference data, the analyzing unit 105 extracts groups of frames in which Olivia appears, as indicated by dashed lines. When "Jack" and "Olivia" are provided as reference data, the analyzing unit 105 extracts groups of frames in which both Jack and Olivia appear, corresponding to the overlapping portions of the solid lines and the dashed lines.

The analyzing unit 105 changes the processing method in accordance with whether the video index has been attached to the video data, and also, if the video index has been attached, which format the video index adopts. The analyzing unit 105 also changes the processing method in accordance with the format of the reference data. The reference data may be in video data format, text data format, or speech data format.

Figure 8:
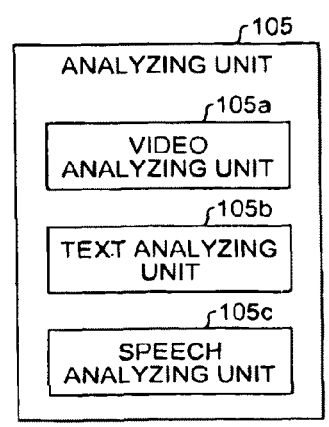
FIG. 8 is a block diagram for showing a detailed structure of an analyzing unit.

The function of the analyzing unit 105 is explained in detail below. As indicated in FIG. 8, the analyzing unit 105 includes a video analyzing unit 105*a*, a text analyzing unit 105*b*, and a speech analyzing unit 105*c*.

The video analyzing unit 105*a* compares the reference data in video data format with the video index attached as video data or the input video data itself, and thereby extracts candidates of images to be included in the output video data.

For example, a situation is considered where a frame image in which Olivia appears is given as reference data, and the name of an image data file "Olivia.bmp" as indicated by the set-up item 412 in FIG. 4 has been attached as a video index to the video data. In this situation, the video analyzing unit 105*a* executes a matching process onto the frame image of the reference data and the image data of the file designated in the video index. When the level of similarity between the frame image of the reference data and the image data of the file is equal to or exceeds a predetermined threshold value, the video analyzing unit 105*a* determines that the video data of the two types match, and extracts the images of the 270th frame to the 1799th frame as candidates of images to be included in the output video data. The level of similarity of the video data may be calculated by use of, for example, the sum of absolute difference (SAD), the sum of squared difference (SSD), or the S/N ratio. Technologies of object detection (face detection) and object verification (face verification) may also be adopted for the calculation.

When a video index is not attached, the video analyzing unit 105*a* analyzes the input video data itself, and compares it with the reference data, thereby extracting the compared frame as a candidate image. For example, when an image of Jack or Olivia is given as reference data, the video analyzing unit 105*a* executes a matching process onto each frame of the video data and the image data provided as the reference data. In this manner, the video analyzing unit 105*a* can detect which of the performers appears in which frame.

The video index created in the above process may be attached to the video data. In this manner, the analysis result of the video data can be reused. When the video index is attached but no matching frame is found, the process may be conducted in the same manner as when no video index is attached.

The text analyzing unit 105*b* is now explained. The text analyzing unit 105*b* compares the reference data in text data format with the video index provided as text data, and extracts candidates of images to be included in the output video data.

A situation is considered, in which the text data "Olivia" is given as reference data, and the text data of the name of the person who appears in the video data, "Olivia", has been attached as a video index to the video data, as indicated by the set-up item 411 in FIG. 4. In this situation, the text analyzing unit 105*b* executes a matching process onto the text data of the reference data and the text data of the video index. Then, when the level of similarity between the text data of the reference data and the text data of the video index is equal to or exceeds a predetermined threshold value, the text analyzing unit 105b determines that the two text data items match. Thus, the text analyzing unit 105b can extract frame images between the 270th frame to the 1799th frame as candidates of images to be included in the output video data. The level of similarity of the text data can be calculated by comparing the entire text data or part of the text data. Alternatively, dictionary data in which similarities among text data are accumulated may be used for the calculation. Even when no video index is attached, the text analyzing unit 105b can perform the same process by use of the text data.

An explanation on the speech analyzing unit 105c is now given. The speech analyzing unit 105c compares the reference data in speech data format with a video index that is attached as speech data or the speech data itself that is attached to the video data, and extracts candidates of images to be included in the output video data.

For example, a situation is considered, in which the speech data of "Olivia" is provided as reference data, and the name of a speech data file "Olivia.wav" has been attached as a video index to the video data, as indicated by the set-up item 413 in FIG. 4. In this situation, the speech analyzing unit 105c executes a matching process on the speech data of the reference data and the speech data of the file designated in the video index. Then, when the level of similarity between the speech data of the reference data and the speech data of the file designated in the video index is equal to or exceeds the threshold value, the speech analyzing unit 105c determines that the two speech data items match. The speech analyzing unit 105c therefore extracts frame images between the 270th frame and the 1799th frame in which the speech data items match, as candidates of images to be included in the output video data. The level of similarity in the speech data may be calculated from the correlation between the data of speech waves.

When no video index is attached, the speech analyzing unit 105c analyzes the speech data attached to the input video data and compares it with the reference data, thereby extracting matching frames as candidate images. In this process, however, a scene in which the name "Olivia" is uttered can be extracted, but this scene may not always be the one in which Olivia appears. This is because the speech data "Olivia" may not always be attached to a scene in which Olivia appears.

When speech data is given as reference data, types of extracted candidate images largely differ between the video data with a video index and the video data without a video index, as described above. For this reason, information specifying an extraction method may be input together with the reference data so that the extraction method can be adopted in accordance with this information.

Furthermore, the speech analyzing unit 105c may use, instead of speech data in which the name of the person "Olivia" is uttered, the speech data having the voice of Olivia as reference data to extract a scene in which Olivia makes an utterance. In such a structure, the speech analyzing unit 105c does not perform a matching process on words in the speech data but on voice qualities by use of pattern analysis.

The video generating unit 106 in FIG. 1 selects suitable images from the candidate images extracted by the analyzing unit 105 in accordance with predetermined conditions of determining the attributes of frames to be included in the output video data and the output mode (hereinafter, "output video data generation conditions"), and performs a process of combining selected images to generate the output video data.

The output video data generation conditions include conditions of selecting and combining images and conditions of laying out the images. The conditions of selecting and combining images determine a criterion for giving the candidate images extracted by the analyzing unit 105 the order of priority and the method of preparing a composite image from the selected images.

Figure 9:
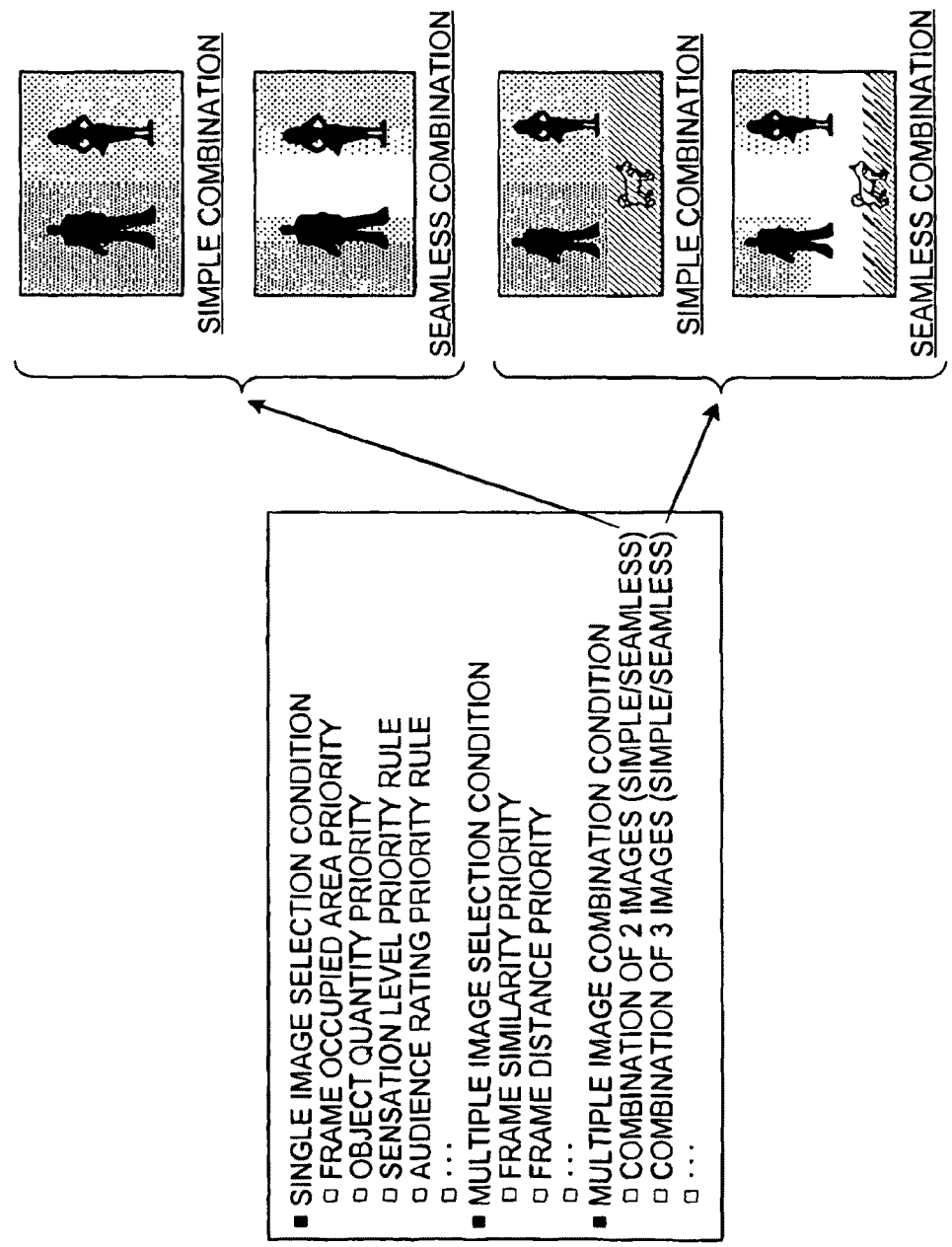
FIG. 9 is a diagram for showing examples of image selection and combination conditions.

As indicated in FIG. 9, the image selection and combination conditions include conditions of selecting a single image from the image candidates, conditions of selecting multiple images from the image candidates, and conditions of combining the images.

For a condition of selecting a single image, a rule indicating which condition is regarded as the first priority can be designated in relation to the attributes of frames, such as a frame occupied area priority rule, an object quantity priority rule, a sensation level priority rule, and an audience rating priority rule.

According to the frame occupied area priority rule, an image of the person subjected to the verification or the like being provided in the largest size in a frame is preferentially included in the output video data. According to the object quantity priority rule, an image showing the largest number of people or objects in addition to the person designated in the reference data is preferentially included in the output video data. According to the sensation level priority rule, an image having the highest level of sensation calculated from the loudness of the audience, for example, in a sports program video is preferentially included in the output video data. According to the audience rating priority rule, an image having the highest peak audience rating at the time of broadcasting or the highest peak audience rating among images having ratings higher than a predetermined value is preferentially included in the output video data. Numerical information assigned as a video index can be adopted for the level of sensation and the audience rating.

As the conditions for selecting multiple images, a rule indicating which condition is given the first priority is designated regarding the attributes of frames, such as a frame similarity priority rule and a frame distance priority rule.

According to the frame similarity priority rule, the similarity between candidate images is calculated based on the sum of absolute difference (SAD) or the sum of squared difference (SSD), and images with the lowest level of similarity are preferentially included in the output video data.

In the selection of images with a low level of similarity, a method of clustering images in accordance with their features may be adopted. More specifically, when three images are to be selected, a frame group of candidate images may be clustered in accordance with the features of the images (vectors), and a frame positioned the closest to the center of each of the three clusters may be selected as output video data. With such a process, the people appearing in various manners can be seen from the three pictures.

According to the frame distance priority rule, candidate images that have the largest frame distance therebetween, or in other words candidate images that have the largest interval between their playback times, are included in the output video data. In contrast to the above, rules of preferentially including images with the highest level of similarity or images with the smallest frames interval therebetween in the output video data may be adopted.

For another example of an image selection and combination condition, a rule of not selecting any candidate images positioned after a certain frame as the output video data may be adopted. When the video data is, for example, a sports or drama program, the output video data can be generated in this manner not to show the user the ending of the game or the story.

As conditions of combining multiple images, conditions in relation to frame outputting modes, such as conditions of combining two images or three images, can be designated. The conditions can be more specifically designated, such as simple side-by-side arrangement and seamless combination of the images, as indicated on the right side of FIG. 9. In addition to the seamless combination, various conventional filtering techniques may be included in the combination conditions.

An example of an image selected from the candidate images in accordance with the image selection and combination conditions is explained below.

Figure 10:
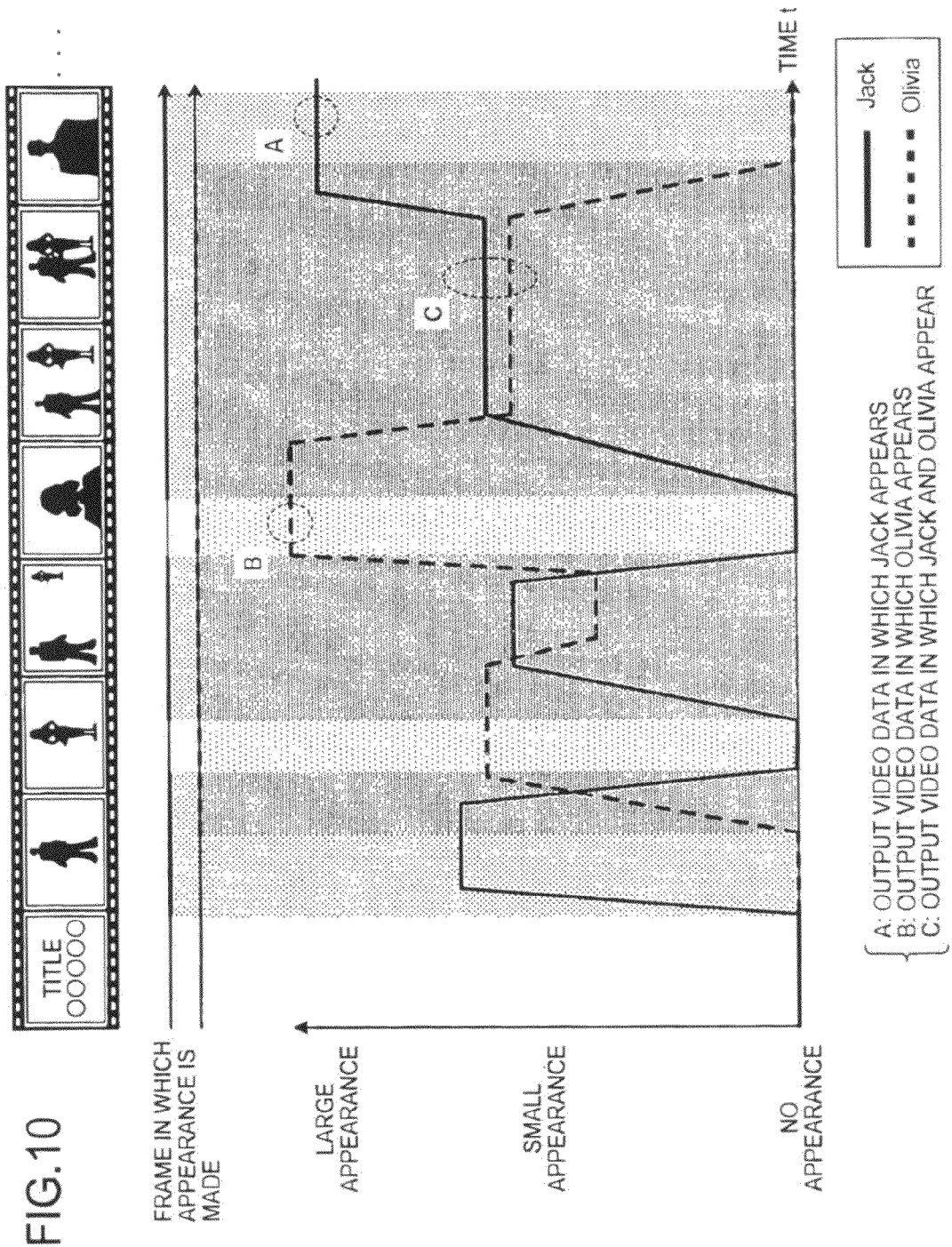
FIG. 10 is a diagram for showing an example of images selected in accordance with a condition of frame occupied area priority.

For example, when an image in which Jack appears is to be selected, the analyzing unit 105 extracts all the frames in which Jack appears as candidate images. Then, the video generating unit 106 uses the frame occupying rates of the person to assign priorities to the extracted candidate images. In other words, the video generating unit 106 further analyzes the frames of the candidate images to determine how large Jack is shown in each frame. The frame with Jack in the largest size is selected. In the example of FIG. 10, Jack is shown in the largest size in frame A, and thus the video generating unit 106 selects frame A as the output video data.

When an image with Olivia is to be selected, the video generating unit 106 executes the same process and selects frame B as the output video data. When a scene in which Jack and Olivia appear together is to be selected, the video generating unit 106 searches for a frame showing the two people in the largest size and selects frame C as the output video data.

The other category of conditions included in the output video data generation conditions, layout conditions, is now explained.

The layout conditions include various factors in relation to frame outputting modes, such as the number of frames for the output video data, the coordinates of the position at which each frame image is arranged, the size of each frame image (scaling factor), and display time. The layout conditions also include priority information of each frame image so that the positions and sizes on the layout are assigned to the frame images in order of priorities. The frame image with the highest priority is usually arranged at the most conspicuous position in the largest size.

Figure 11:
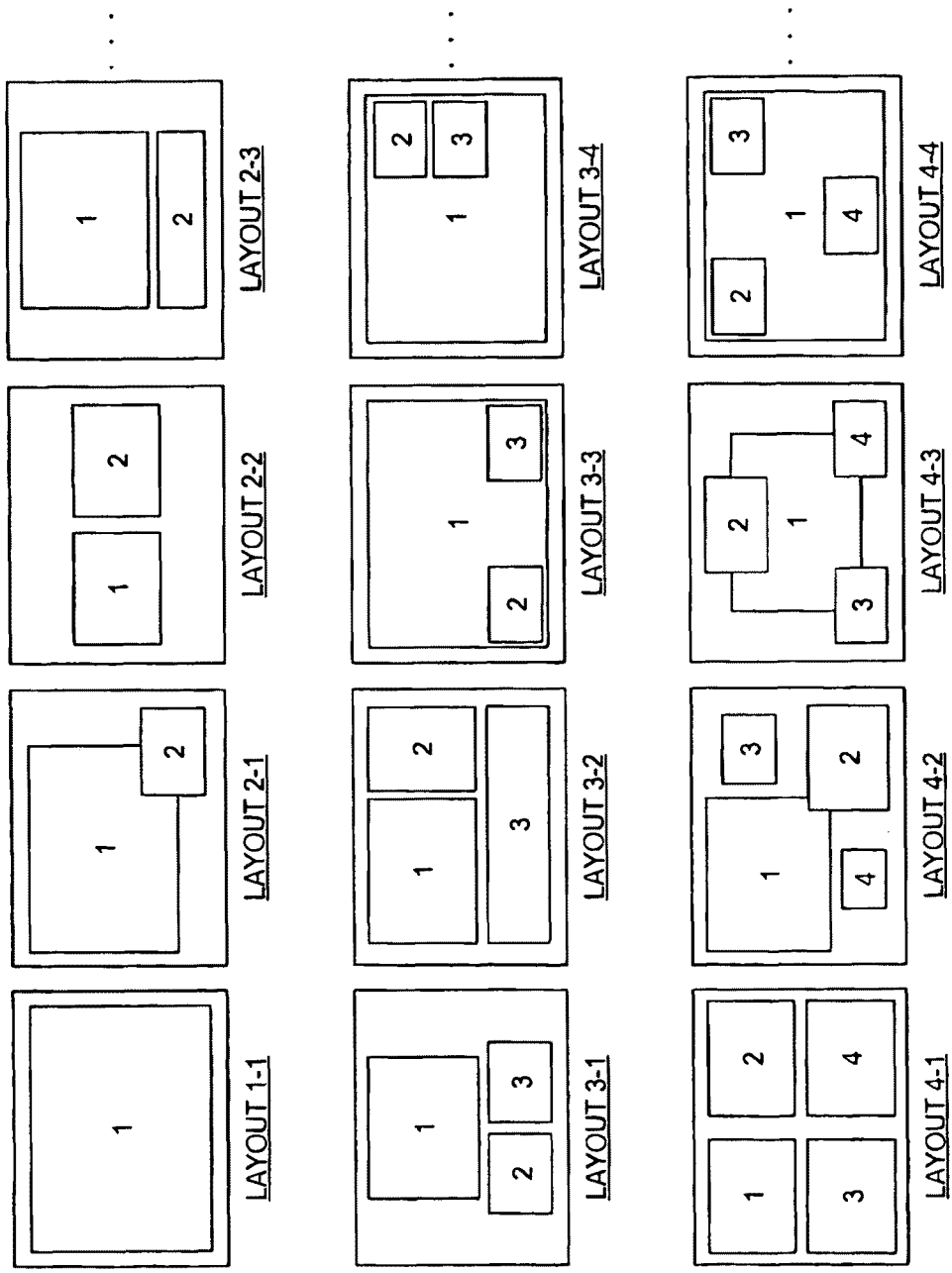
FIG. 11 is a diagram for showing examples of layout conditions.

As shown in FIG. 11, each layout condition is identified by a layout name described as "layout #-#". In this description, the number of images included in the layout is set to the symbol "#" on the left. The serial number is set to the symbol "#" on the right for each layout condition for a certain quantity of images.

With a single image, the only possible layout is the image simply displayed on the entire screen or part of the screen. With two images or more, a layout condition can be designated from various conditions in which relative positions and sizes of the images vary.

The numerals in the frames of the images in the layouts denote the order of priorities. The video generating unit 106 assigns the order of priorities to the selected images in descending order of frame occupying rates of the image data used for the comparison or any predetermined criterion. Then, the video generating unit 106 arranges the images in the frames in which the corresponding priority number is given in accordance with the assigned order of priorities.

The layout conditions include layouts in which frames of different aspect ratios are arranged, as shown in layout 2-3 and layout 3-2. For example, when layout 2-3 is selected, the video generating unit 106 arranges the image of the first priority by simply performing a scaling process thereon. On the other hand, the video generating unit 106 needs to convert the image of the second priority into a horizontally long image and then arranges it in the corresponding frame.

The image may be converted to the horizontally long image with a method of converting the aspect ratio by scaling or by trimming. For this reason, when such a layout condition is selected, information specifying a conversion method may be included in the layout conditions.

When trimming is performed, a condition of incorporating the entire object designated in the reference data (the person Jack, for example) without missing any portion of the object may be included.

Some of the layout conditions, as in layout 3-3, layout 3-4, and layout 4-4, have frames overlapping one another. Such layout conditions may further include the transparency of the overlapping portion of each frame. When layout 3-3 is selected, for example, a condition may be included, in which the images of the second and third priorities may be displayed with the transparency of 0.8, whereas the image of the first priority is displayed with the transparency of 0.2 to overlap the other images.

The video generating unit 106 generates output video data in the above manner by selecting and combining frame images in accordance with the image selection and combination conditions and arranging the frame images in accordance with the layout conditions. The image selection and combination conditions and the layout conditions may be ones that are predetermined and fixed, or layout conditions may be ones that can be customized by each user. Furthermore, layout information distributed on the Internet may be downloaded and incorporated.

With a simpler method, the video generating unit 106 may select the leading frame image, a middle frame image, or any randomly selected frame image from the extracted candidate images, and generates the output video data directly from the selected frame image. In such a case, the output video data generation condition may be designated from among the image selection conditions of the "leading frame image", "middle frame image", "randomly selected frame image" and the like. For the image combination condition, "not combined" is designated. For the layout condition, "display on screen without processing (full-screen display)".

The output controlling unit 107 controls the process of outputting the output video data and the reference data extracted by the reference data extracting unit 104 to the output unit 153. The output controlling unit 107 associates the output video data with the reference data and outputs the data to the output unit 153. In this manner, the output video data and the reference data can be compared with each other, and which output video data is created from which reference data can be easily understood. In addition, the reference data group and the video data can be compared in terms of which portions are related to each other and similar to each other.

When the reference data is video data, the output controlling unit 107 displays the reference data onto the output unit 153 in the same manner as the display of the output video data. When the reference data is text data, the output controlling unit 107 displays the text data on the output unit 153 in the method using a vector font or a raster font. When the reference data is speech data, the output controlling unit 107 outputs speech through a speaker (not shown). The reference data and the output video data may be displayed on the same output medium or on different output media.

Figure 12:
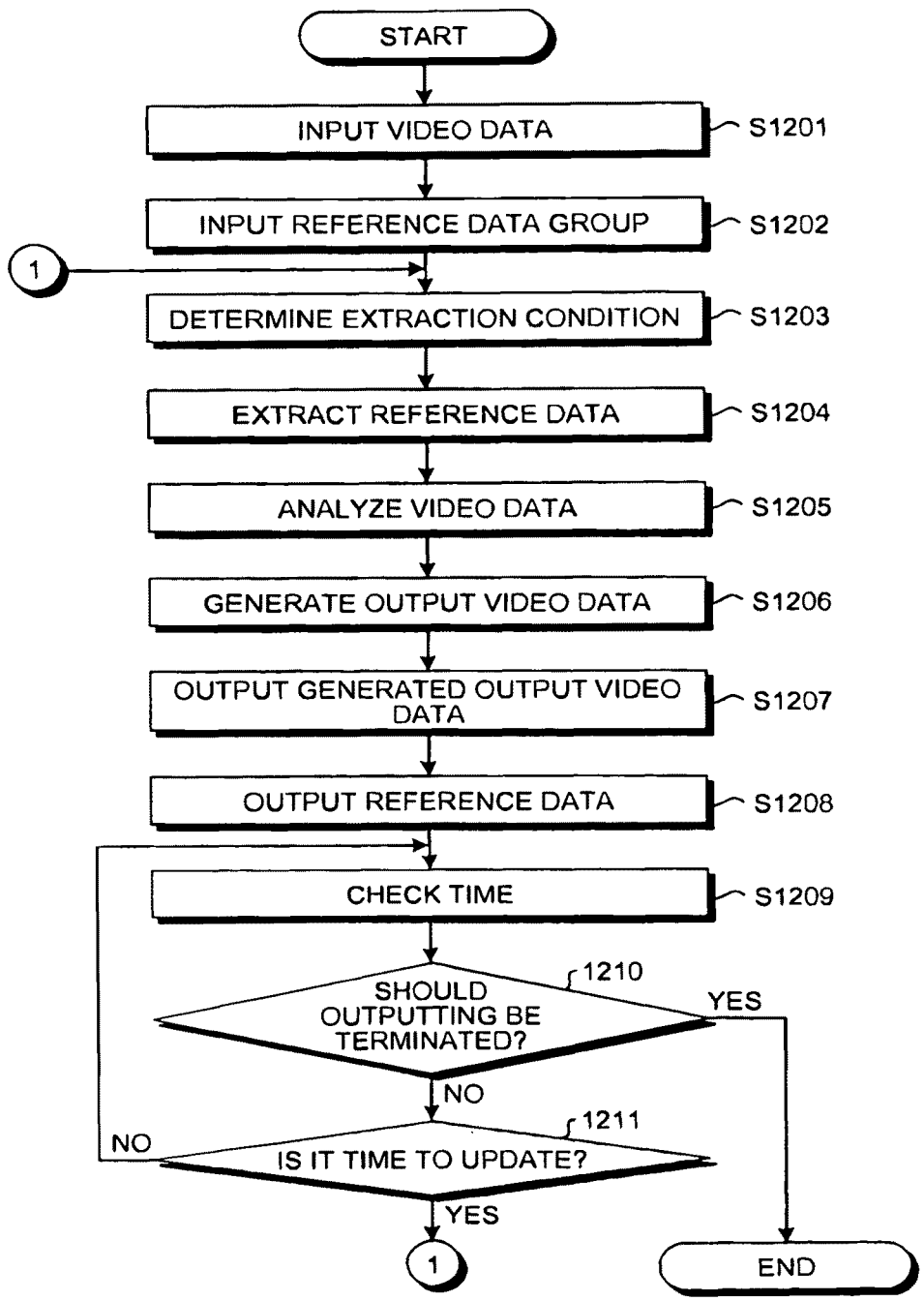
FIG. 12 is a flowchart of a video outputting process according to the first embodiment.

The video outputting process performed by the PC 100 configured as described above according to the first embodiment is explained with reference to FIGS. 12 and 13.

First, the video input unit 101 inputs at least one item of video data to which a video index is attached in advance, or of video index to which no video index is attached (step S1201). The video input unit 101 inputs, for example, video data 1301 indicated at the bottom of FIG. 13.

Next, the reference data input unit 102 inputs at least one reference data group (step S1202). The reference data input unit 102 inputs, for example, a reference data group 1302 having video data, as indicated at the top of FIG. 13.

Thereafter, the extraction condition determining unit 103 determines an extraction condition of extracting at least one item of reference data from the input reference data group (step S1203). The extraction condition determining unit 103 determines, for example, the frame number of a frame 1303 in the reference data group 1302 having video data, as an extraction condition.

The reference data extracting unit 104 extracts at least one item of reference data that satisfies the determined extraction condition from the input reference data group (step S1204). In the example of FIG. 13, the reference data extracting unit 104 extracts the frame 1303 as reference data.

Then, the analyzing unit 105 analyzes the input video data, and extracts a frame that suits the extracted reference data as a candidate of an image to be included in the output video data (step S1205). As indicated in FIG. 13, the analyzing unit 105 extracts as a candidate image, for example, a frame 1305 in which Jack appears from the video data.

Next, the video generating unit 106 selects suitable images from the extracted candidate images in accordance with the output video data generation conditions, and performs a combining process on the images to generate the output video data (step S1206). As shown in FIG. 13, the video generating unit 106 generates, for example, output video data 1306 that incorporates the frame 1305 without processing it.

Thereafter, the output controlling unit 107 outputs the generated output video data to the output unit 153 (step S1207). Further, the output controlling unit 107 outputs the reference data extracted at step S1204 to the output unit 153 (step S1208).

The output controlling unit 107 checks the playback time of the video data (step S1209), and determines whether the outputting process should be terminated (step S1210). In other words, the output controlling unit 107 determines whether all the video data has been played back. The output controlling unit 107 determines that the outputting process should be terminated when the user provides an instruction of terminating the outputting process.

When the outputting process should not be terminated (No at step S1210), the extraction condition determining unit 103 determines whether it is the time to update the extraction condition (step S1211). For example, the extraction condition determining unit 103 determines that it is the time to update the extraction condition every time when a predetermined period of time elapses.

When it is not the time for updating (No at step S1211), the system goes back to the checking of the playback time to repeat the process (step S1209). When it is the time for updating (Yes at step S1211), the next extraction condition is selected to repeat the process (step S1204).

Figure 13:
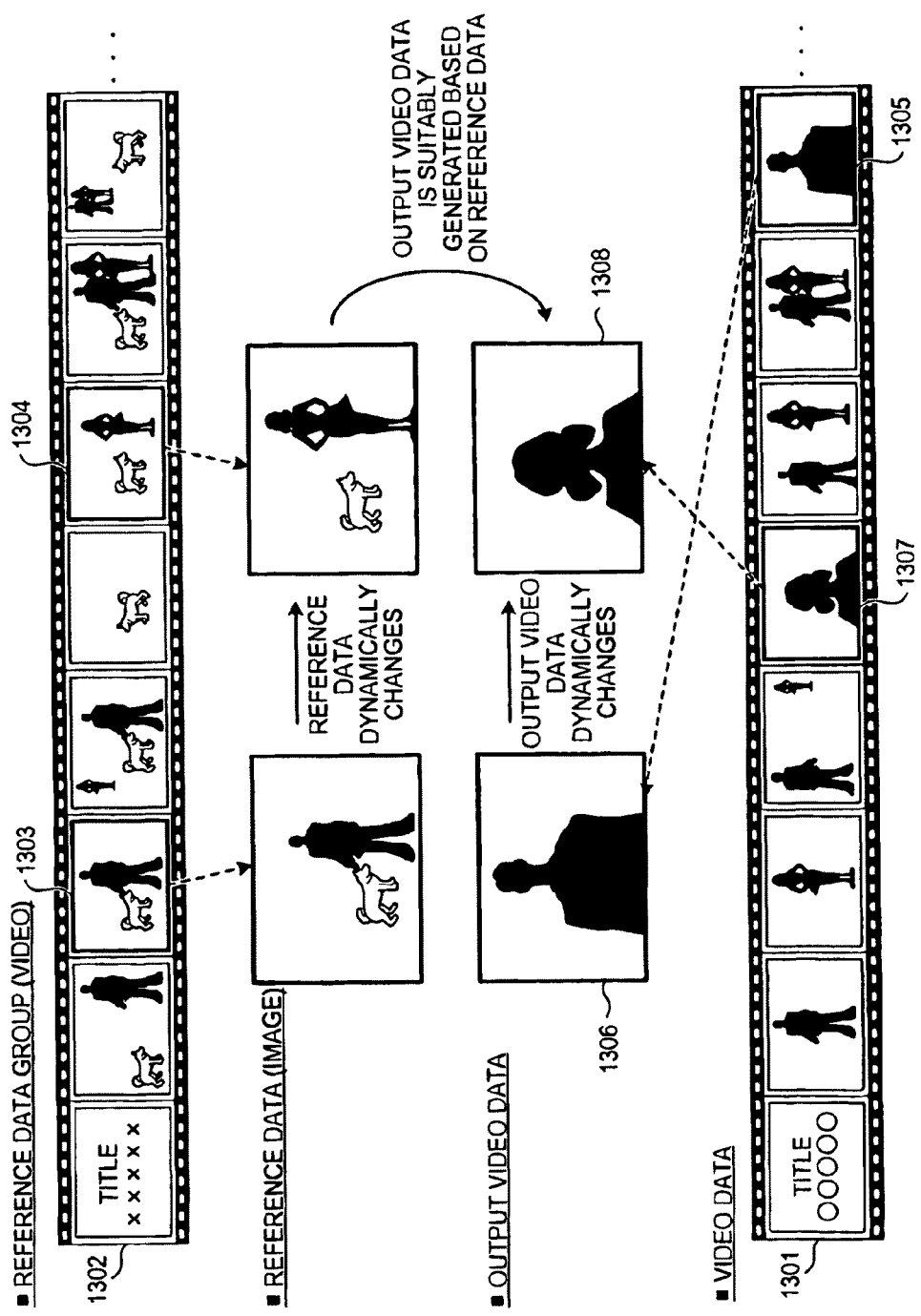
FIG. 13 is a diagram for showing examples of data dealt with in the video outputting process.

It is assumed, for example, that the extraction condition determining unit 103 updates the extraction condition every time when the predetermined period of time elapses, and determines a frame 1304 in FIG. 13 as an extraction condition. Then, the reference data extracting unit 104 extracts the frame 1304 as reference data. Furthermore, the analyzing unit 105 extracts a frame 1307 in the video data that matches the frame 1304, as a candidate image, and the video generating unit 106 generates output video data 1308 that contains the frame 1307 without processing it.

When it is determined at step S1210 that the outputting process should be terminated (Yes at step S1210), the video outputting process is terminated.

In the above process, the reference data extracted in accordance with the dynamically updated extraction condition is dynamically varied, in accordance of which the generated output video data can be dynamically varied. For this reason, instead of fixed images selected or created in accordance with a predetermined criterion, various images that dynamically change can be created and generated. In addition, the extraction condition can be changed in response to the operation by the user, the user freely controls the video output.

Figure 14:
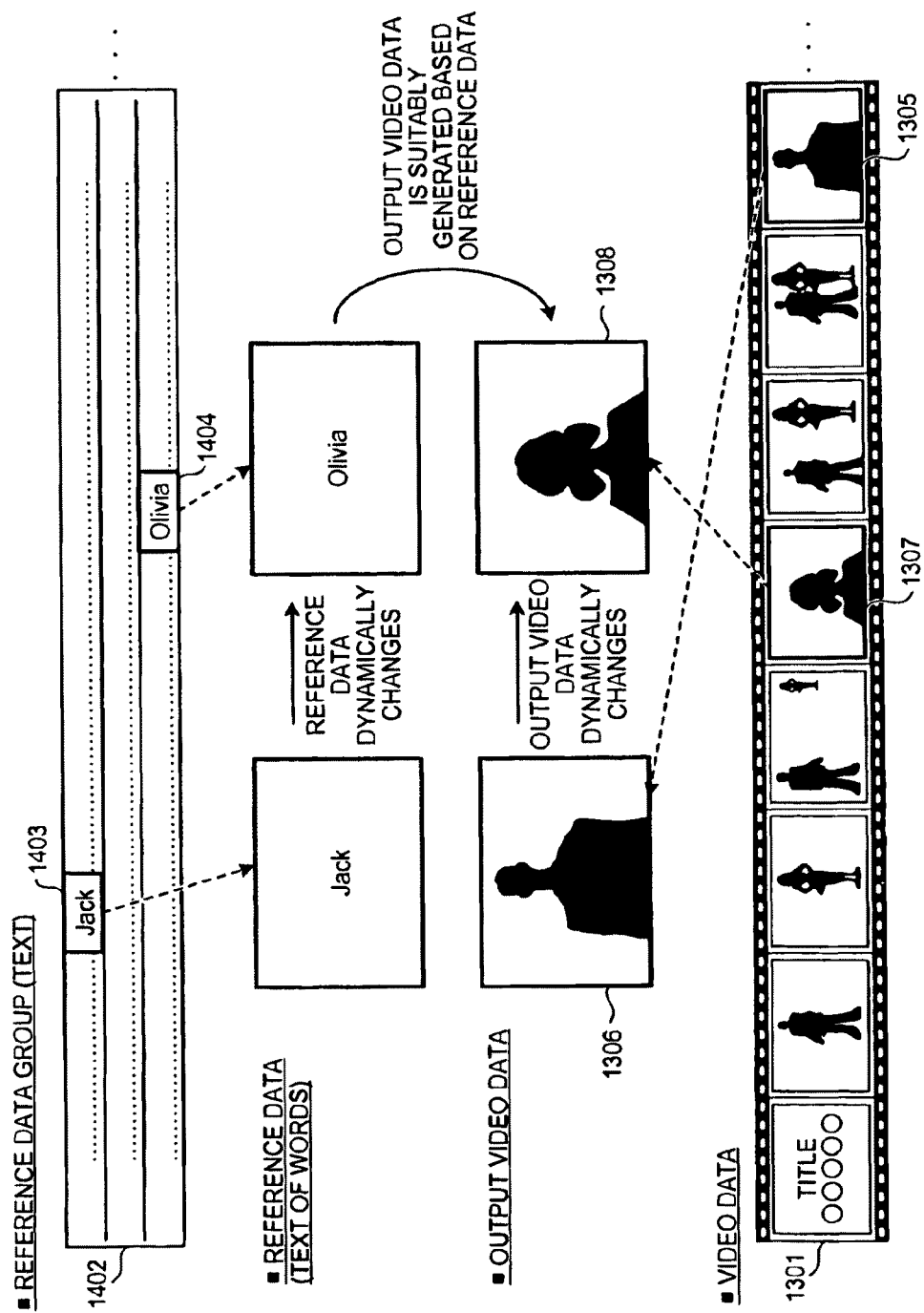
FIG. 14 is a diagram for showing examples of data dealt with in the video outputting process.
Figure 15:
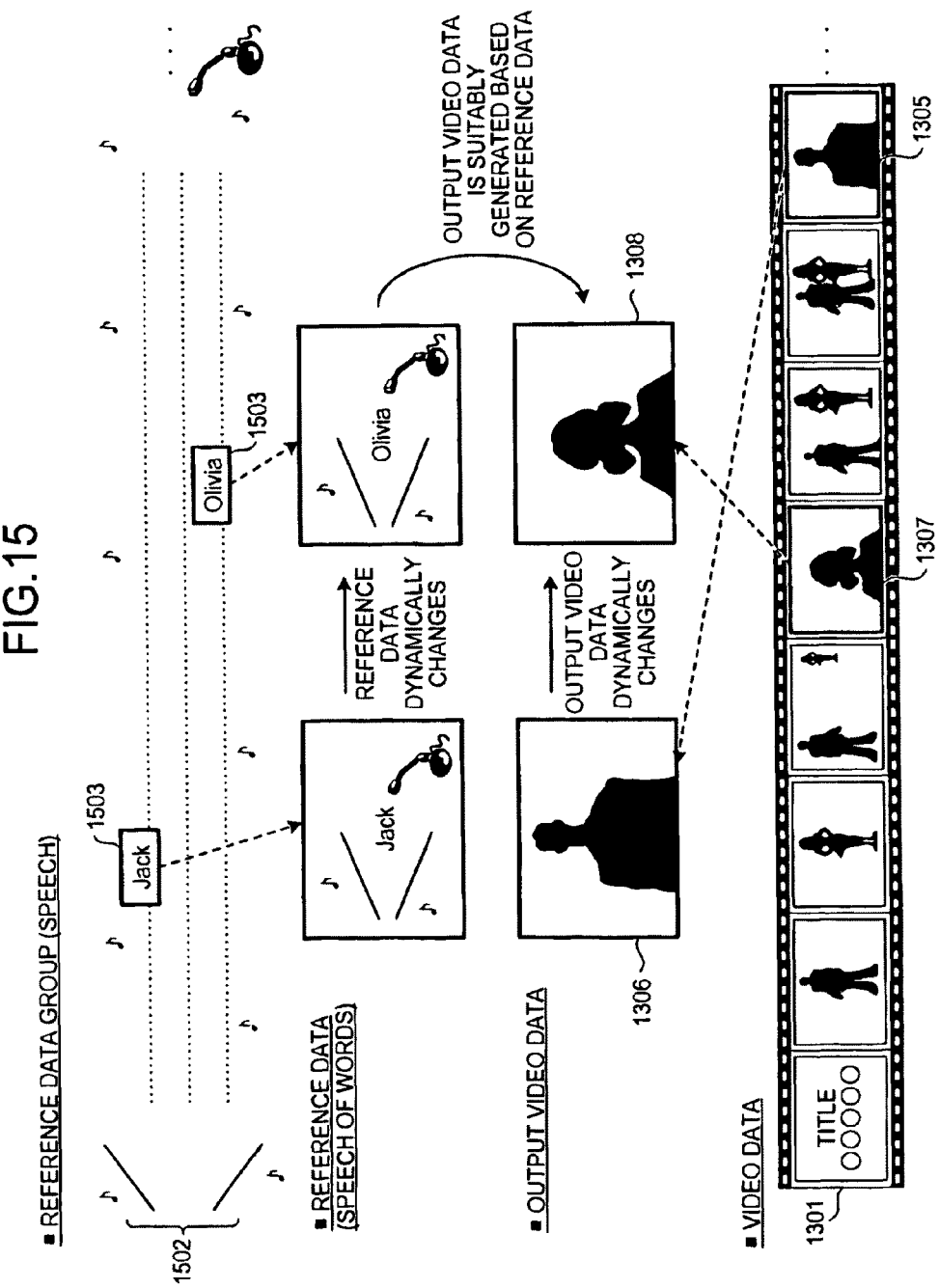
FIG. 15 is a diagram for showing examples of data dealt with in the video outputting process.

An example of the video outputting process executed when text data and speech data are input as a reference data group is now explained. FIGS. 14 and 15 are diagrams for showing examples of various types of data dealt with in the video outputting process when text data and speech data, respectively, are input as a reference data group. It is assumed that the video data 1301 the same as that of FIG. 13 indicating the video data being input as the reference data group is input.

In the example of FIG. 14, text data 1402 is input as a reference data group. When text data "Jack" and "Olivia" is attached as a video index to the frames 1305 and 1307, respectively, of the video data 1301, the frame 1305 that matches a word 1403, for example, is extracted as a candidate image in a similar manner as in FIG. 13, and the output video data 1306 is generated.

When the extraction condition is updated to the number of a word 1404, the extracted reference data changes to the word 1404, and the extracted candidate image becomes the frame 1307. Furthermore, the generated video data dynamically changes from the output video data 1306 to the output video data 1308.

In FIG. 15, speech data 1502 is input as a reference data group. When speech data "Jack" and "Olivia" is attached to frames 1305 and 1307, respectively, of the video data 1301 as a video index, the frame 1305 that matches speech 1503 is extracted as a candidate image in a similar manner to FIG. 13, with which the output video data 1306 is generated.

When the extraction condition is updated to the number of speech 1504, the extracted reference data becomes the speech 1504, and the extracted candidate image changes to the frame 1307 accordingly. Furthermore, the generated video data dynamically changes from the output video data 1306 to the output video data 1308.

The video outputting apparatus according to the first embodiment extracts a frame from the video data by use of reference data extracted from a reference data group that is related to the video data in accordance with an extraction condition, and generates and displays output video data that includes the extracted frame. Moreover, because the extraction condition dynamically changes with the passage of time or the like, the extracted reference data can be dynamically updated, as a result of which, the generated output video data can also be dynamically updated.

With the above method, various output images can be generated and displayed from the input video data in accordance with the preference of the user and with different situations. Furthermore, instead of outputting all the video data that is input, output video data that is created by combining frames that suit the extracted reference data is output. Thus, video that the user wishes to view only is effectively displayed.

Moreover, the video outputting apparatus according to the first embodiment may be applied to editing of already-existing video data. In particular, by inputting existing video data and also inputting dynamically changing reference data, output video data is created any time in correspondence with the reference data. Thus, the created output video data can be stored as a new video data item.

In addition, the provider of the video data may provide the user with only a small amount of data of a reference data group and an extraction condition instead of a large amount of video data, the provider may allow the user to view the video data that the user already possesses in a manner that the provider recommends. For example, when the provider inputs an appealing message about a person, an object, a place, or the like in the form of text data, the user may view the video in relation to the person, the object, or the place described in the message. In addition, information such as "this portion of the video should be paid attention to when viewing" and "the video should be viewed in this order" may be provided as a dynamic condition of showing the video, or in other words, as reference data.

A reference data group and an extraction condition do not have to be input by the user. Those may be input by somebody else staying with the user, or data stored in a recording medium such as an HDD, a CD, and a DVD may be input. Alternatively, data distributed on the Internet or the like may be used.

A video outputting apparatus according to a second embodiment includes a reference data storage unit that associates reference data items with one another. The video outputting apparatus makes the reference data acquired from the reference data storage unit usable. In addition, the validity of the process of extracting a suitable frame and the validity of the result of the process of generating the output video data is judged. By providing the judgment result as feedback, more suitable reference data becomes available.

Figure 16:
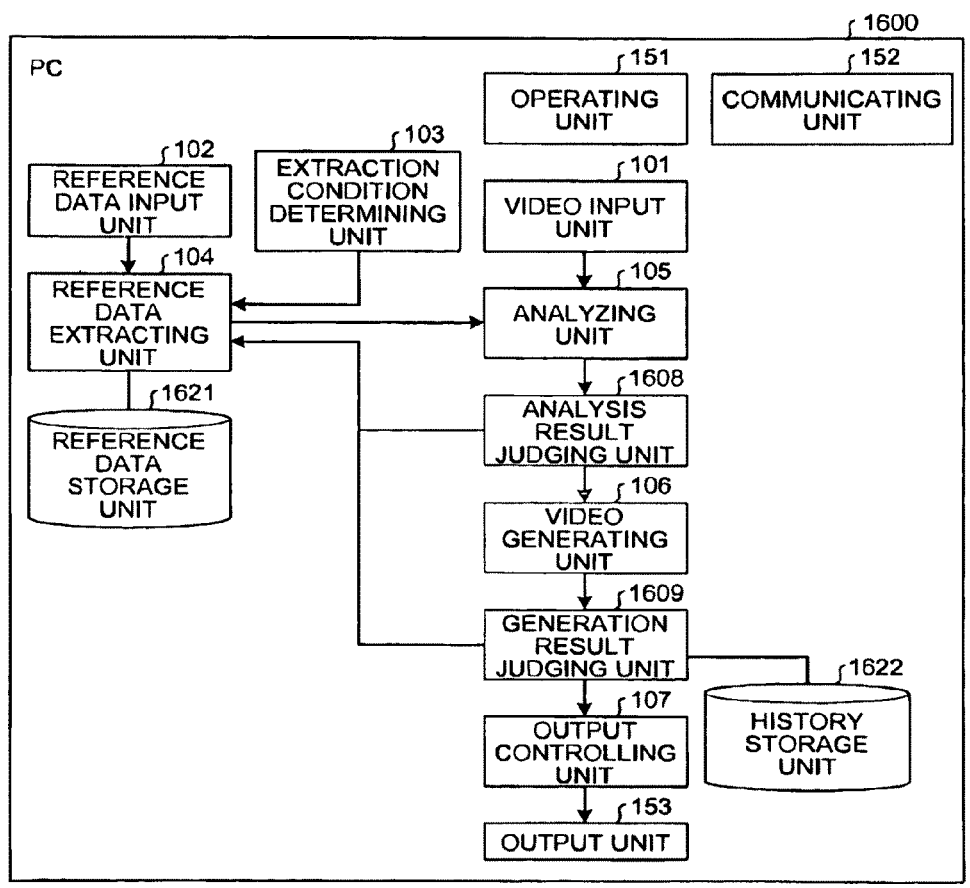
FIG. 16 is a block diagram of a video outputting apparatus according to a second embodiment.

As illustrated in FIG. 16, the hardware structure of a PC 1600 mainly includes the operating unit 151, the communicating unit 152, the output unit 153, a reference data storage unit 1621, and a history storage unit 1622. The software structure of the PC 1600 mainly includes the video input unit 101, the reference data input unit 102, the extraction condition determining unit 103, a reference data extracting unit 1604, the analyzing unit 105, the video generating unit 106, the output controlling unit 107, an analysis result judging unit 1608, and a generation result judging unit 1609.

The second embodiment is different from the first embodiment in the function of the reference data extracting unit 1604, and incorporation of the reference data storage unit 1621, the history storage unit 1622, the analysis result judging unit 1608, and the generation result judging unit 1609. The rest of the structure and functions is the same as the PC 100 according to the first embodiment illustrated in the block diagram of FIG. 1. The same components are given the same numerals, and the explanation thereof is omitted.

The reference data storage unit 1621 stores therein a reference data group and reference data that are the same as the reference data group input by the reference data input unit 102 and the reference data extracted by the reference data extracting unit 1604, as well as link information indicating the relationship of the reference data items.

The analyzing unit 105 needs to effectively narrow down candidate images that are to be included in the output video data and suitably adjust the quantity and quality of images to be included in the output video data. To achieve this, it is preferable that the reference data extracted from the reference data group be converted to a different format, and that new reference data be created and used in relation to the reference data.

The reference data storage unit 1621 provides the reference data extracting unit 1604 with data necessary for the conversion and creation of reference data. When the reference data storage unit 1621 is not incorporated, the reference data extracting unit 1604 extracts suitable reference data from the input reference data group only.

Figure 17:
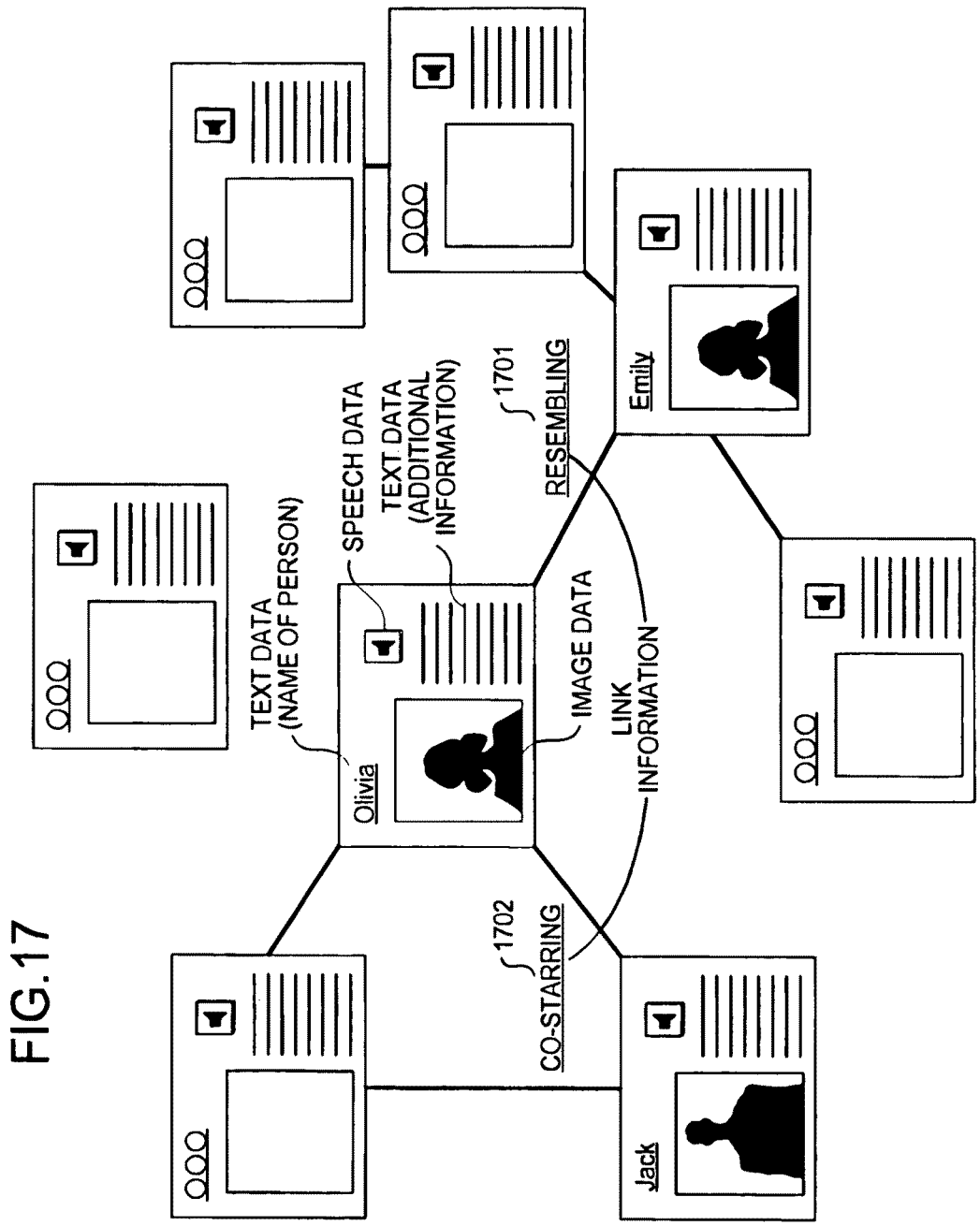
FIG. 17 is a diagram for showing an example of a structure of reference data stored in a reference data storage unit.

As shown in FIG. 17, the reference data storage unit 1621 stores therein additional information on various people, objects, and places, including their names, images, speeches, and URL's, as reference data. The reference data storage unit 1621 also includes link information that associates reference data items with one another.

For example, when the text data "Olivia" is extracted as reference data from the reference data group, an access is made to the reference data storage unit 1621 as illustrated in FIG. 17. In relation to this text data, image information and speech data of "Olivia" can be thereby acquired.

The reference data including video data, text data, speech data, and the like that is stored in the reference data storage unit 1621 in relation to a person, an object, or a place is not limited to one item. Multiple items of reference data may be stored therein.

For example, as Olivia's image data, three different image data items, for example, of her smiling face, crying face, and surprised face, may be stored. These three image information items may be selected as reference data. Variations of reference data can be increased with different combinations of multiple video data, text data, and speech data items.

As described above, the reference data storage unit 1621 stores therein the link information that indicates the association between people, between a person and an object, between objects, between an object and a place, and the like. In an example of FIG. 17, link information 1701 indicating that a person "Olivia" resembles a person "Emily", and link information 1702 indicating that "Olivia" and "Jack" co-star is stored. With such link information, new reference data can be generated from data on people, objects or places relating to the reference data extracted from the reference data group.

The reference data storage unit 1621 may be configured to store therein predetermined data, or to store data downloaded from an external memory medium or a database on a network. Furthermore, the reference data group and the reference data input by the reference data input unit 102 may be added to the reference data storage unit 1621.

The history storage unit 1622 stores therein the output video data generated in the past by the video generating unit 106. More specifically, the history storage unit 1622 stores therein the output video data each time the generation result judging unit 1609 that will be explained later judges the generation of the output video data as being successful. The history storage unit 1622 may be configured to store therein the frame numbers of frames of the video data included in the output video data. The history storage unit 1622 may also be configured to store therein the reference data that has been used to generate the output video data, in association therewith.

The history of the output video data stored in this manner is used by the generation result judging unit 1609 for judgment making, and plays an important role in giving feedback to the reference data extracting unit 1604 (described later).

The reference data storage unit 1621 and the history storage unit 1622 may be formed of any generally-used memory medium such as a hard disk drive (HDD), an optical disk, a memory card, and a random access memory (RAM).

The reference data extracting unit 1604 effectively extracts the reference data by use of the reference data storage unit 1621. The reference data extracting unit 1604 may extract a new item of reference data with a predetermined extracting method, or with an extracting method designated by the analysis result judging unit 1608 or some other unit. The method of extracting reference data designated by some other unit will be explained in the description of the analysis result judging unit 1608 and the generation result judging unit 1609.

The reference data extracting unit 1604 may adopt, for example, a simple method of extraction, such as "when a person's name in text data is extracted as reference data, add the portrait image of the person as a new reference data item" and "when image information of a portrait image of a person is extracted as reference data, add a portrait image of the person with a different facial expression as a new reference data item".

The analysis result judging unit 1608 makes a judgment on the result of the analysis by the analyzing unit 105, and provides the reference data extracting unit 1604 with the judgment result as feedback. For example, the analysis result judging unit 1608 judges the consistency of the forms of the reference data and the video data, and gives the reference data extracting unit 1604 an instruction as to what kind of reference data should be further extracted.

The forms of video data can be classified, depending on whether a video index is added and, if any, what form of data is added as the video index.

The judgment process of the analysis result judging unit 1608 and the new reference data extraction process of the reference data extracting unit 1604 are explained below.

The judgment on the consistency of the forms of the reference data and the video data is explained first. The analysis of the video data can improve the efficiency of the candidate image extraction only when a video index is attached to the video data and when the medium (data form) of the video index matches the medium of the reference data.

As shown in the set-up item 411 in FIG. 4, for example, when the performer's name "Olivia" in text data is attached as a video index, it is preferable that the reference data be "Olivia" in text data. In the same manner, when the image file "Olivia.bmp" is attached as a video index, it is preferable that the reference data be "Olivia" in image information. Further, when the speech file "Olivia.wav" is attached as a video index, it is preferable that the reference data be "Olivia" in speech data.

For this reason, the analysis result judging unit 1608 compares the form of the reference data with that of the video data. When the forms are different, the analysis result judging unit 1608 determines that candidate images are not suitably extracted, and sends an instruction of converting the reference data in conformity with the form of the video data to the reference data extracting unit 1604.

When sending an instruction, instruction information that includes information indicating the conversion of the reference data and a form of the reference data to be converted to may be sent to the reference data extracting unit 1604. The method of sending the instruction is not limited thereto, however. Any method with which the reference data extracting unit 1604 can re-extract reference data in accordance with the judgment result can be adopted.

For example, it is assumed that "Olivia" in text data is provided as reference data although image information of "Olivia" is attached as a video index to show that Olivia appears in the data. Then, the analysis result judging unit 1608 sends an instruction to the reference data extracting unit 1604 to convert the reference data from "Olivia" in text data to "Olivia" in image information. The reference data extracting unit 1604 may convert the form of the reference data by use of the reference data storage unit 1621.

When no video index is available, or in other words, when there is no text data, video data, or speech data that provides additional information on the content of the video data, the analyzing unit 105 analyzes the frame information of the video data and the speech data attached to the video data, and compares the analyzed data with the reference data. Thus, when there is no video index and "Olivia" in text data is supplied as reference data, the analyzing unit 105 cannot extract a group of frames in which Olivia appears, based on the analysis of the video data.

When dealing with video data without a video index attached, the analysis result judging unit 1608 sends an instruction to the reference data extracting unit 1604 to use the image information or speech data of Olivia as reference data so that an analysis of the frame information or the speech data of the video itself becomes possible.

As an alternative method, when text data is supplied as reference data although no video index is attached to the video data, the analysis result judging unit 1608 may issues an instruction to convert the text data to the image information. This allows a process of matching the reference data with the text data included in the video data such as telop information. Frame images in which the text data is displayed can be extracted as candidates of images that are to be included in the output video data.

The feedback process for the data form conversion may be executed in advance. In such a case, the analyzing unit 105 does not extract candidate images at the first analysis process but outputs the forms of the video data and the reference data only. The analysis result judging unit 1608 judges the conformity of the output forms of the video data and the reference data, and sends the judgment result to the reference data extracting unit 1604 as feedback. In response to the feedback, the reference data extracting unit 1604 performs conversion of the form of the reference data. Finally, the analyzing unit 105 extracts candidate images by use of the reference data obtained from the conversion.

The determination on the number of extracted candidate images (i.e. the number of frames) that are to be included in the output video data is explained below. The final decision on the appropriate number of candidate images is made by the generation result judging unit 1609, which will be explained later. However, when no candidate image is found, it is preferable that the analysis result judging unit 1608 determines the validity and gives feedback to the reference data extracting unit 1604.

For example, it is assumed that the video data as illustrated in FIG. 2 is input, and that the video data showing Jack, Olivia, and a dog together is input as reference data. The video data of FIG. 2 does not have any frame with a dog, however. Thus, the analyzing unit 105 cannot find a candidate image that suits the reference data.

In such a case, the analysis result judging unit 1608 judges the number of candidate images as 0, and issues an instruction of the conversion of the reference data. More specifically, the analysis result judging unit 1608 instructs the reference data extracting unit 1604 to divide the reference data into video data of Jack, of Olivia, and of a dog.

The analysis result judging unit 1608 further makes a judgment on candidate images extracted in accordance with the divided reference data. Then, for example, when it is found that there is no frame with a dog, the analysis result judging unit 1608 instructs the reference data extracting unit 1604 again to change the reference data to the video data showing Jack and Olivia together.

By changing the condition "Jack, Olivia, and a dog being shown together" to the condition "Jack and Olivia being shown together", the condition is loosened. When no candidate image is found even after the condition is loosened, the condition is further loosened to repeat the process. For example, the condition may be changed to "Jack being shown", or "a person who resembles Jack being shown". In addition to the text data "Jack", Jack's nickname or the like may be added to the reference data.

When candidate images that are extracted after loosening the condition are displayed, the transparency may be increased to a larger extent for images for which the condition is loosened, to display at a lower level of luminance. If no candidate image is found even after the condition is loosened, a fully blackened image or any particular image may be displayed.

To prevent the number of candidate images from excessively increasing, the analysis result judging unit 1608 may be configured to issue an instruction to change the reference data in a manner to reduce the number of candidate images when the number of candidate images exceeds a predetermined threshold value.

For example, when the text data "Jack" is given as reference data and a large number of candidate images are extracted as corresponding frames, the analysis result judging unit 1608 may issue an instruction to change the reference data to include a typical portrait of Jack in addition to the text data "Jack". Alternatively, the instruction may be to obtain Jack's middle or family name from the reference data storage unit 1621 and convert the reference data to the text data of Jack's full name. The analysis result judging unit 1608 may issue an instruction to change the reference data in the above manner when the number of candidate images is greater or smaller than the predetermined threshold value, or to change the threshold value used by the analyzing unit 105 when extracting candidate images that are to be included in the output video data. For example, when the analyzing unit 105 extracts too few candidate images by use of the portrait image of Jack as the reference data, based on the analysis made with reference to a certain threshold value, the analysis result judging unit 1608 may lower the value of the threshold value and supplies it to the reference data extracting unit 104 as feedback. Then, by using the same portrait image of Jack as reference data, the analyzing unit 105 can make an analysis with reference to the small threshold value and thereby extract an appropriate number of candidate images.

In this manner, the analysis result judging unit 1608 repeatedly issues an instruction to re-extract the reference data, and appropriate candidate images can be thereby extracted.

The analysis result judging unit 1608 may execute a judgment process in accordance with a predetermined feedback method as described above, or with a feedback method that is externally input.

The function of the generation result judging unit 1609 in FIG. 16 is explained below. The generation result judging unit 1609 makes a judgment on the result generated by the video generating unit 106, and supplies the judgment result to the reference data extracting unit 1604 as feedback. More specifically, the generation result judging unit 1609 makes judgment on the quantity and quality of candidate images that are to be included in the output video data. When it is determined that the quantity or quality of candidate images is not appropriate, the generation result judging unit 1609 instructs the reference data extracting unit 1604 to extract a different reference data item.

Whether the quantity and quality of candidate images extracted by the analyzing unit 105 are suitable depends on the output video data generation conditions. For example, when a large number of images are to be included in the final output video data, more candidate images are required. On the other hand, when, for example, the given condition is "to select images that differ from one another as much as possible" but a large number of images that are similar to one another are extracted as candidate images, the candidate images are not of a suitable quality. Thus, the generation result judging unit 1609 makes a judgment on the quantity and quality of candidate images to be included in the output video data that is generated in accordance with the output video data generation conditions, and sends the judgment result to the reference data extracting unit 1604 as feedback.

The generation result judging unit 1609 may judge whether the output video data satisfies the output video data generation conditions after it is generated by the video generating unit 106, or may judge whether output video data that would satisfy the output video data generation conditions can be generated before it is generated by the video generating unit 106.

The judgment on the quality of candidate images is first explained. When, for example, three images in which the person Jack appears in different shots are to be included in the output video data, it is preferable that three images showing Jack in as different postures as possible be extracted as candidate images. If, however, candidate images are extracted from the video data without a video index attached by use of reference data that includes information of a single image, frames that correspond to the information of this image are extracted as candidate images. In other words, it is highly possible that frames that are similar to one another are extracted.

If this is the case, the generation result judging unit 1690 first calculates the similarity level of the extracted candidate images. Then, the generation result judging unit 1690 compares the calculated similarity level with the threshold value of similarity preset for an image selection condition "select images that are largely different from one another".

When the calculated similarity level is greater than the threshold value, or in other words when it is determined that similar images are selected, the generation result judging unit 1609 instructs the reference data extracting unit 1604 to add image information on two more images stored in the reference data storage unit 1621 to the reference data. In this manner, three images showing Jack in different shots can be extracted as candidate images. Furthermore, by incorporating speech data or the like into the reference image, variations of candidate images can still be expanded.

The judgment on the number of candidate images is explained next. As discussed above, the number of candidate images is judged by the analysis result judging unit 1608 also. However, even when the analysis result judging unit 1608 judges the number of candidate images as being appropriate, it may be found at the time of generating output video data that there are not sufficient candidate images or too many candidate images.

In such a situation, the generation result judging unit 1609 provides the reference data extracting unit 1604 with feedback to make the number of candidate images appropriate. For example, the designated number of frames that are used for the output video data under a layout condition exceeds the maximum number that the analysis result judging unit 1608 can make a judgment on, the generation result judging unit 1609 gives the reference data extracting unit 1604 feedback to inform that more candidate images are required.

Furthermore, for example, the rule of audience rating priority is designated as an image selection and combination condition, but the extracted candidate images do not include images with an audience rating equal to or higher than a threshold value. Then, the generation result judging unit 1609 provides the reference data extracting unit 1604 with feedback to inform that more candidate images are required.

The generation result judging unit 1609 may issue an instruction to reflect the output video data generation condition itself on the reference data. This applies to cases in which a condition of always displaying on the upper left corner of the output video data a frame image in which the title is displayed, or a condition of always displaying on the upper right corner of the output video data a frame image with the peak audience rating, is designated as an output video data generation condition. With such a condition, the first process of extracting candidate images may not be able to acquire a frame image that satisfies the condition. Thus, the generation result judging unit 1609 determines whether candidate images include any frame image that satisfies the condition. When there is no such frame image, the generation result judging unit 1609 sends the reference data extracting unit 1604 an instruction of adding the text data having the title to the reference data, or an instruction of adding numerical information on a frame with the peak audience rating to the reference data.

Such a feedback process can realize an effective display of the output video data, in which, for example, some of the images are displayed in a static manner independent from the reference data, whereas other images are displayed in a dynamic manner in accordance with the reference data.

The generation result judging unit 1609 may be configured to issue an instruction to reflect the output video data itself on the reference data. For example, program A in which Jack appears is supplied as video data, and program B also in which Jack appears is given as a reference data group. Jack is dressed differently in program A and program B. In such a situation, when extracting suitable scenes from program A by using image data of Jack extracted from program B as reference data, the extraction of the scenes with Jack may not be appropriately conducted because of his different clothes between the two programs.

Then, the generation result judging unit 1609 instructs the reference data extracting unit 1604 to add the candidate images of the program A extracted in the first process to the reference data. Thereafter, the analyzing unit 105 re-extracts candidate images by use of the updated reference data. In this manner, scenes with Jack can be extracted by using image data of Jack in the same clothes as reference data. In other words, more suitable extraction of candidate images can be realized.

The judgment made by use of the history storage unit 1622 is explained now. If the reference data extracted by the reference data extracting unit 1604 changes very little over a certain period of time, the output video data cannot be dynamically changed in accordance with a dynamic change of the reference data. Thus, the generation result judging unit 1609 makes a judgment on changes of the reference data stored in the history storage unit 1622. When determining that the reference data has not been changed for a certain period of time, the generation result judging unit 1609 instructs the reference data extracting unit 1604 to change the reference data.

For example, when a portrait image of Jack is selected as reference data and this state is continued for 5 seconds, the generation result judging unit 1609 gives the reference data extracting unit 1604 feedback so that a different portrait image of Jack can be incorporated as new reference data. In this manner, scenes with Jack in various expressions can be shown every 5 seconds.

The generation result judging unit 1609 makes a judgment on the change of the output video data, and instructs the reference data extracting unit 1604 to change the reference data when determining that the output video data has not changed for a certain period of time. If the output video data is stored in the history storage unit 1622 in accordance with the frame numbers, the generation result judging unit 1609 makes a judgment on the change of the output video data by checking the consistency of the frame numbers. If the history storage unit 1622 stores therein the output video data itself, the generation result judging unit 1609 judges the similarity of the video data items by analyzing the output video data. More specifically, the generation result judging unit 1609 calculates the S/N ratios of the images and determines the level of similarity based on the calculated values. When the level of similarity is smaller than a predetermined threshold value, the generation result judging unit 1609 judges the output video data as being changed. In contrast to the above example, the history storage unit 1622 may be configured to suppress the radical change of the output video data. If the generation result judging unit 1609 checks the changes of the output video data and found that there is a significant change from the output video data item that has been input immediately before, the generation result judging unit 1609 provides the reference data extracting unit 1604 with feedback. With this feedback, the generation result judging unit 1609 instructs the reference data extracting unit 1604 to add the reference data item used immediately before the current reference data item, or to incorporate the interpolation data between the current reference data item and the preceding reference data item into the reference data. For example, when the video of Jack is extracted as the preceding reference data item, and the video of Olivia is extracted as the current reference data item, the video of Jack suddenly changes to the video of Olivia. For this reason, the preceding reference data item of Jack is kept for a certain period of time so that the visual effect can be created in which the video of Jack smoothly changes to the video of Olivia, instead of jumping to the video of Olivia.

The generation result judging unit 1609 may execute a judgment process in accordance with a feedback method predetermined from among the above methods, or with a feedback method that is externally input.

Figure 18:
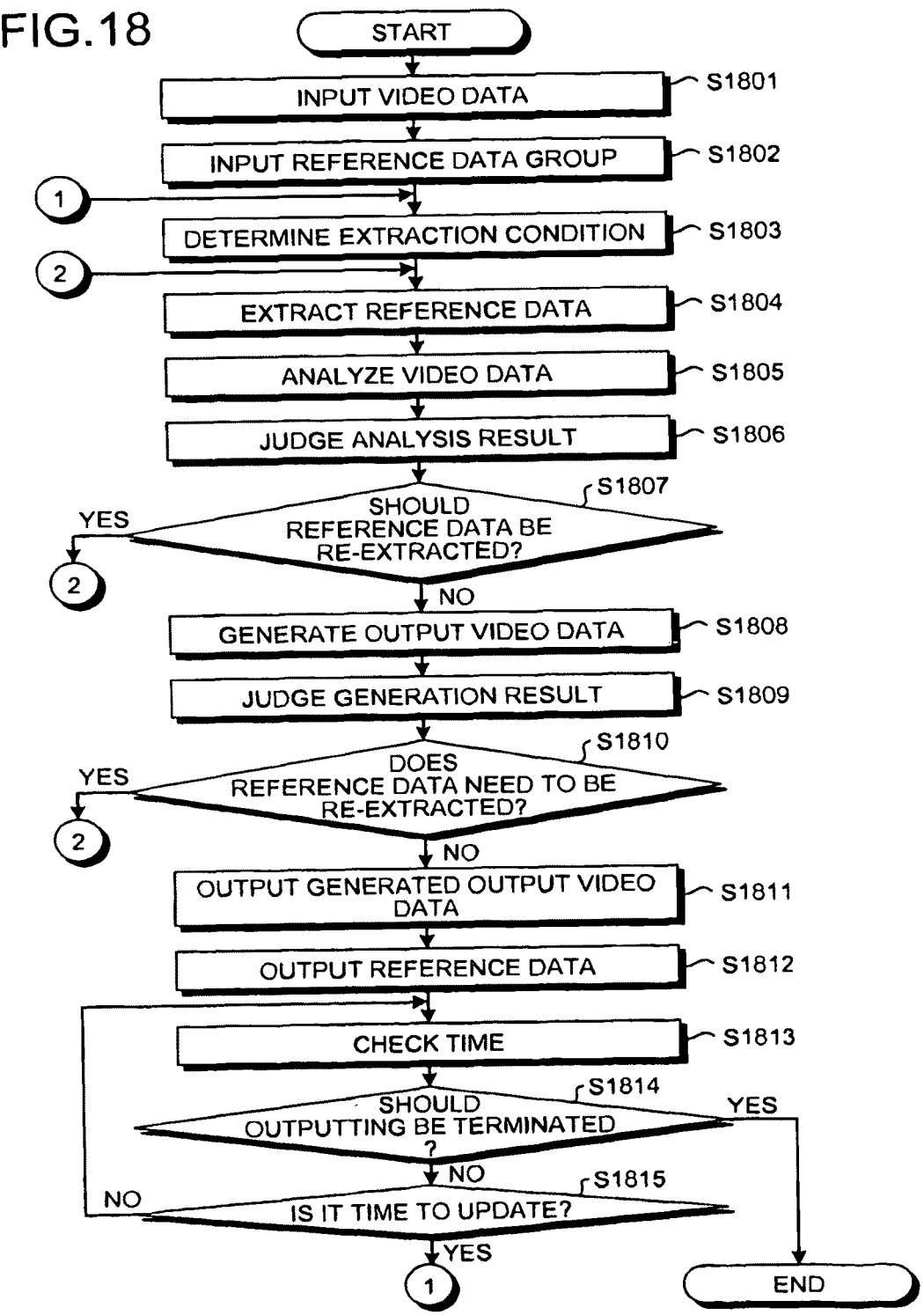
FIG. 18 is a flowchart of a video outputting process according to the second embodiment.

The video outputting process executed by the PC 1600 according to the second embodiment is discussed with reference to FIG. 18.

The processes at steps S1801 through S1805 are the same as steps S1201 through S1205 of the PC 100 according to the first embodiment, and thus the explanation thereof is omitted.

After the analyzing unit 105 analyzes the video data and extracts candidate images, the analysis result judging unit 1608 makes a judgment on the analysis result obtained from the analyzing unit 105 (step S1806). More specifically, the analysis result judging unit 1608 judges the consistency of the forms of the reference data and the video data, and the number of candidate images that are to be included in the extracted output video data.

Based on the judgment result, the analysis result judging unit 1608 determines whether the reference data should be re-extracted (step S1807). When the re-extraction should be performed (Yes at step S1807), the analysis result judging unit 1608 instructs the reference data extracting unit 1604 to re-extract. In response to the instruction, the reference data extracting unit 1604 performs the process of re-extracting the reference data (step S1805).

When the re-extraction is not performed (No at step S1807), the video generating unit 106 generates the output video data in accordance with the output video data generation conditions (step S1808).

Next, the generation result judging unit 1609 judges the result of the output video data generated the video generating unit 106 (step S1809). In particular, the generation result judging unit 1609 determines the quantity and quality of the candidate images to be included in the output video data, as described above.

Based on the judgment result, the generation result judging unit 1609 determines whether the reference data should be re-extracted (step S1810). When the re-extraction should be performed (Yes at step S1810), the generation result judging unit 1609 instructs the reference data extracting unit 1604 to re-extract. In response to the instruction, the reference data extracting unit 1604 performs the process of re-extracting the reference data (step S1805).

The processes at steps S1811 through S1815 are the same as steps S1207 through S1211 of the PC 100 according to the first embodiment, and thus the explanation thereof is omitted.

The video outputting apparatus according to the second embodiment incorporates appropriate reference data by referring to the reference data storage unit that associates reference data items with one another and judging the result of analyzing the video data or the result of generating the output video data. In this manner, the output video data can be efficiently generated with the updated reference data. In addition, the output video data can be still more efficiently generated by referring to the history of output video data that is output in the past to judge the result of generating the output video data.

A video outputting apparatus according to a third embodiment adopts output video data generation conditions that are determined in accordance with constraints that are related to the video data viewing environment such as the size and resolution of the input display screen, in output video data generation.

Figure 19:
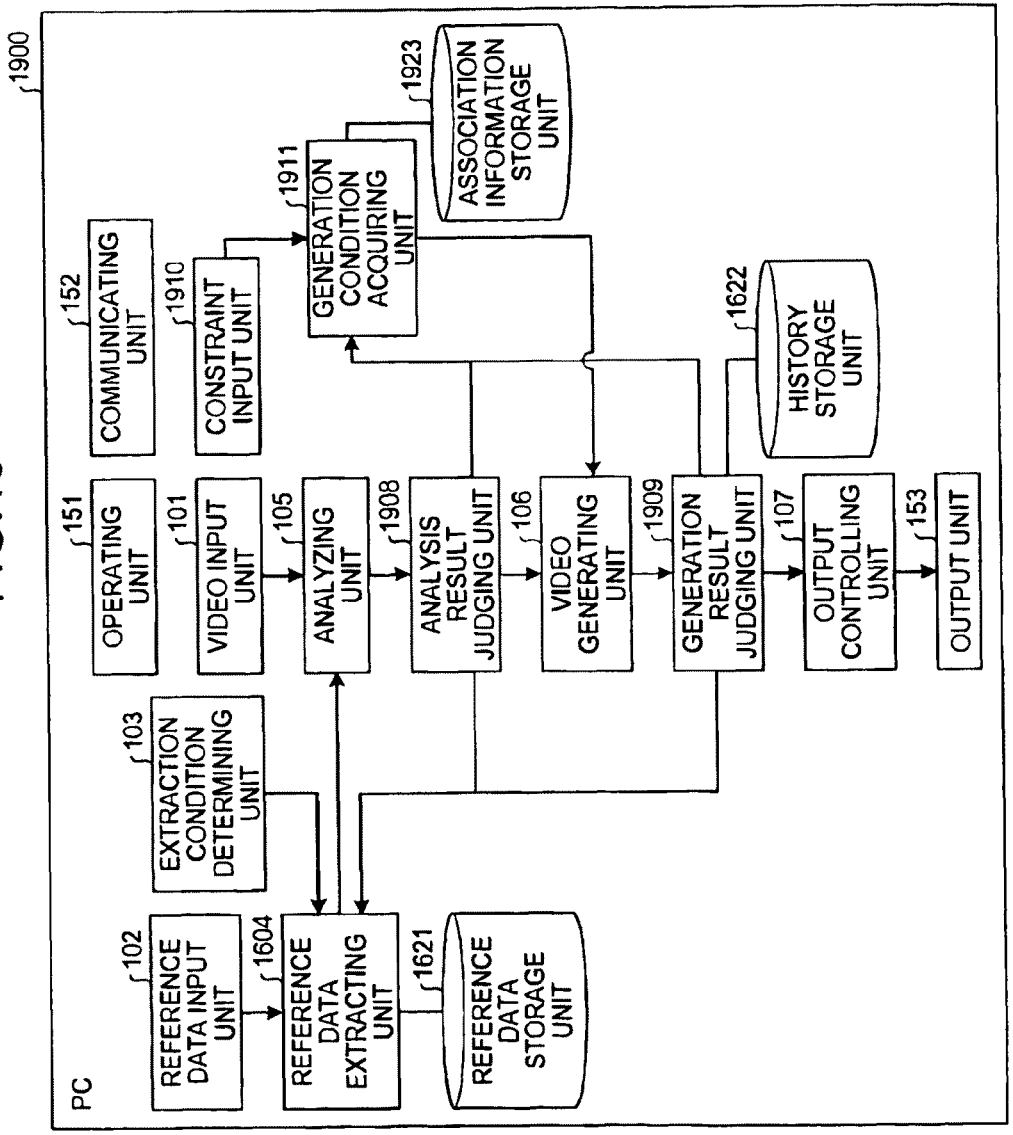
FIG. 19 is a block diagram of a video outputting apparatus according to a third embodiment.

As illustrated in FIG. 19, the main hardware structure of a PC 1900 includes the operating unit 151, the communicating unit 152, the output unit 153, the reference data storage unit 1621, the history storage unit 1622, and an association information storage unit 1923. The software structure of the PC 1900 includes the video input unit 101, the reference data input unit 102, the extraction condition determining unit 103, the reference data extracting unit 1604, the analyzing unit 105, the video generating unit 106, the output controlling unit 107, an analysis result judging unit 1908, a generation result judging unit 1909, a constraint input unit 1910, and a generation condition acquiring unit 1911.

The third embodiment is different from the second embodiment in the functions of the analysis result judging unit 1908 and the generation result judging unit 1909, and the incorporation of the association information storage unit 1923, the constraint input unit 1910, and the generation condition acquiring unit 1911. The rest of the structure and the functions is the same as the PC 1600 according to the second embodiment illustrated in the block diagram of FIG. 16. Thus, the same numeral is assigned, and the explanation of the same components is omitted.

The association information storage unit 1923 stores therein association information in which predetermined constraints are associated with the output video data generation conditions. As indicated in FIG. 20, the association information includes the constraints and the output video data generation conditions.

The constraints designate, for example, constraints in relation to the display medium, the type of video data, the environment of the user, and the like. The constraints in relation to the display medium include the size and resolution of the display screen, the maximum number of images that can be displayed, the maximum size of an image that can be displayed, and the like. The constraints in relation to the types of video data include video genre information and the like. The constraints in relation to the environment of the user include the user's preference, the history of viewing, the positional relationship with other users, the distance between the display medium and the user, the user's eyesight and health condition, and the like.

In the field of the constraints in FIG. 20, multiple constraints may be designated in combination. The constraints are not limited to the above, and any conditions in relation to the viewing of the video can be applied.

As the output video data generation conditions, any of the image selection and combination conditions indicated in FIG. 9 or the layout conditions indicated in FIG. 11, which are discussed in the first embodiment, can be selected. In the field of the output video data generation conditions, multiple output video data generation conditions may be designated in combination.

The relationship between the constraints and the output video data generation conditions is further discussed. The constrains can be divided into conditions that are mainly related to the image selection and combination conditions of the output video data generation conditions and conditions that are mainly related to the layout conditions of the output video data generation conditions.

The constraints related to the image selection and combination conditions are first explained. One of the constraints in relation to the display medium is the size of the display screen. In other words, the constraint indicates whether the video is to be displayed on a relatively large screen such as a TV or on a relatively small screen such as a cellular phone.

When a scene with a person therein is generated as output video data and the display screen is large, a large image can be displayed. Thus, the person does not have to be shown large. Instead, it is better to generate the output video data from frames in which other people or other objects appear together with the person so that it can be easily understood what action the person is taking. For this reason, it is preferable that the output video data generation conditions be associated with the object quantity priority rule.

On the other hand, when the display screen is small, only small images can be displayed. Thus, it is better to generate the output video data from frames in which the person is shown large enough to immediately recognize. For this reasons, it is preferable that the output video data generation conditions be associated with, for example, the frame occupied area priority rule.

One of the constraints in relation to the types of video data is video genre information. For example, in video genres such as sports programs and dramas, output video data should be generated in a manner not to show the result of a game or the ending of the story in advance. For this reason, the constraint for the video genre information of a sports program or a drama should be associated with an image selection and combination condition included in the output video data generation conditions, "exclude a portion corresponding to the result of a game or the ending of a story".

One of the constraints in relation to the environment of the user is the user's viewing history. For example, even if the genre is a sports program or the like, the output video data may be generated to include the result of the game when the user has already viewed it. For this reason, the constraint in relation to the history of the video data being viewed is associated with an image selection and combination condition included in the output video data generation conditions, which allows to select a portion corresponding to the result of the game or the ending of the story.

A specific example of a constraint in relation to the layout condition is given below. For example, a constraint in relation to the display medium may be a combination of the size and resolution of the display screen, the maximum number of images that can be displayed, and the maximum size of an image that can be displayed.

The constraint may be, for example, a 42-inch display screen with a 1920×1080-pixel resolution, on which four 640×480-pixel images can be displayed at most. This constraint is associated, as output video data generation conditions, with the layout conditions having four images, "layout 4-1" to "layout 4-4" as shown in FIG. 11.

One of the constraints in relation to the types of video data is video genre information, as discussed above. For example, the video in a genre of the landscape of nature looks better when fewer images are displayed in larger size. Thus, the constraint of the video in a genre of the landscape of nature may be associated, as an output video data generation condition, with a layout condition of displaying one large image such as "layout 1-1" in FIG. 11.

On the other hand, in the video of a genre such as a variety show, the content of the program can be suitably shown with many images displayed in smaller sizes. Thus, the constraint of the video genre information being a variety show is associated with the layout condition of, for example, displaying four images such as "layout 4-1" to "layout 4-4" in FIG. 11, as the output video data generation conditions.

One of the constraints in relation to the environment of the user is the distance between the display medium and the user. For example, when the user is positioned far from the TV to watch, it is better to display one 1280×1024-pixel image than four 640×480-pixel images. Thus, the constraint of the distance between the display medium and the user exceeding a predetermined threshold value is associated with a layout condition of displaying a single image in large size, such as "layout 1-1" in FIG. 11.

Another constraint in relation to the environment of the user may be a combination of multiple users' preference and the positional relationship of the users. For example, when two users are watching the video data as illustrated in FIG. 2 on TV, a user A who wants to see a scene in which Jack appears is sitting on the right side with respect to the direction of the TV, while a user B who wants to see a scene in which Olivia appears is sitting on the left side. Frames have been extracted by use of the reference data in relation to Jack and Olivia.

In such a situation, frames extracted by use of reference data in relation to Jack should be arranged on the right side of the output video data, and frames extracted by use of reference data in relation to Olivia should be arranged on the left side of the output video data. The constraint including the user A desiring the video of Jack and the user B desiring the video of Olivia and also including the positional relationship of the users A and B positioned on the right and left in the direction toward the TV should be associated with, for example, the layout condition of displaying four images, such as "layout 4-4" in FIG. 11. More preferably, this layout condition further includes conditions of arranging images showing the people together whom the two users wish to view in the frames of the first and fourth priorities, an image of a person whom the user sitting on the right wishes to view in the third-priority frame, and an image of a person whom the user sitting on the left wishes to view in the second-priority frame.

The association information storage unit 1923 may be configured to store therein predetermined association information, or to download association information from an external memory medium or a database on a network and store therein the downloaded information.

The constraint input unit 1910 inputs any of the constraints as described above. The constraint input unit 1910 inputs, for example, a constraint designated by the user on the operating unit 151. For the constraint in relation to the display medium, the constraint input unit 1910 may be configured to input the constraint obtained from the system information stored in the PC 1900. The constraint input unit 1910 may be configured to input a constraint in relation to the environment of the user based on the detection by a camera or a sensor. The constraint input unit 1910 may be further configured to input a constraint from an external device by way of the communicating unit 152.

The generation condition acquiring unit 1911 acquires output video data generation conditions that correspond to the input constraint from the association information storage unit 1923. For example, when a constraint "display screen size=42 inches, resolution=1920×1080 pixels" is input, the generation condition acquiring unit 1911 acquires "layout 4-1" as a corresponding output video data generation condition from the association information storage unit 1923, as indicated in FIG. 20.

The generation condition acquiring unit 1911 re-extracts output video data generation conditions in response to the feedback from the analysis result judging unit 1908 and the generation result judging unit 1909. The process of re-extracting output video data generation conditions in response to the feedback will be described later.

The layout conditions as indicated in FIG. 11 have been determined based on the image size on a display screen of a certain resolution. The generation condition acquiring unit 1911 may be configured to make changes to the scaling and the aspect ratio included in the layout conditions or make fine adjustments by parallel displacement or the like, in accordance with the input constraints such as the size and resolution of the display screen.

The function of making a judgment on the analysis result obtained by the analyzing unit 105 and providing the generation condition acquiring unit 1911 with the judgment result as feedback is newly given to the analysis result judging unit 1908 is given. This function differentiates the analysis result judging unit 1908 according to the third embodiment from the analysis result judging unit 1608 according to the second embodiment.

As mentioned before, the output video data generation conditions are often influenced by the type of video data. The analysis result judging unit 1908 makes a judgment on the genre information of the video data and the user's viewing history based on the analysis result of the video data, and sends the judgment result to the generation condition acquiring unit 1911. The generation condition acquiring unit 1911 can further acquire output video data generation conditions in correspondence with the received constraints regarding the genre information and the like. When a video index that influences the output video generation condition such as the genre information and the user's viewing history is attached to the video data, the genre information and the user's viewing history are extracted from the video index by analyzing the video data and sent to the generation condition acquiring unit 1911. The genre information is often included in electric program listing data, and the user's viewing history is often stored in the device as an attribute of each program. In the device of the present invention, however, such data can be dealt with as a video index.

The analysis result judging unit 1908 provides the generation condition acquiring unit 1911 with feedback in accordance with the loosening of the reference data conditions and the number of reference data items. For example, when the reference data "Jack, Olivia and dog being shown together" is changed to the reference data "Jack being shown" by loosening the conditions, the analysis result judging unit 1908 provides the generation condition acquiring unit 1911 with feedback so that the frame extracted by use of the updated reference data is displayed at a lower luminance.

Further, when, for example, the reference data in relation to Jack and the reference data in relation to Olivia are given, the manner of arranging the candidate images extracted by use of each reference data item in the output video data should be determined. For this reason, the analysis result judging unit 1908 provides the generation condition acquiring unit 1911 with feedback to instruct to acquire the image selection and combination conditions and the layout conditions for the two types of candidate images. For example, it is assumed that the reference data in relation to Jack and the reference data in relation to Olivia are given. Once the generation condition acquiring unit 1911 acquires "layout 2-1" of FIG. 11 as a layout condition, the output video data is generated with only one frame displayed in large size regardless of the content of the reference data. However, when it is understood from the reference data that both of the two frames, one in which Jack appears and the other in which Olivia appears, are requested to be displayed in large size, the analysis result judging unit 1908 may issue an instruction to change the layout condition to "layout 2-2" in FIG. 11. Furthermore, for example, once the generation condition acquiring unit 1911 acquires the audience rating priority rule as an image selection and combination condition, frames in which Jack appears and Olivia appears may not be suitably selected due to the influence of the audience ratings, regardless of the content of the reference data (e.g. when frames in which Olivia appears have an extremely low audience rating). To effectively select frames in which Jack appears and Olivia appears, an instruction may be issued to change the condition to the frame occupied area priority rule or the like.

The analysis result judging unit 1908 may be configured to send feedback to the generation condition acquiring unit 1911 only.

The generation result judging unit 1909 is given a function of making a judgment on the analysis result obtained by the video generating unit 106 and providing the generation condition acquiring unit 1911 with the judgment result as feedback. This function differentiates the generation result judging unit 1909 according to the third embodiment from the generation result judging unit 1609 according to the second embodiment.

An example of the generation result judging unit 1909 making a judgment on the result of generating the output video data and providing feedback on the acquisition of image selection and combination conditions is given below. When, for example, the frame occupied area priority rule is designated as an image selection and combination condition, the order of priority may not be uniquely determined if candidate images with similar frame occupying rates are extracted.

Then, the generation result judging unit 1909 instructs the generation condition acquiring unit 1911 to adopt the audience rating priority rule as an image selection and combination condition, in addition to the frame occupied area priority rule.

An example of the generation result judging unit 1909 making a judgment on the result of generating the output video data and providing feedback on the acquisition of a layout condition is now given. There is a case in which only two candidate images are extracted although the layout condition requiring three images is designated. In such a situation, the generation result judging unit 1909 instructs the generation condition acquiring unit 1911 to change the layout condition to a layout that arranges two images.

The generation result judging unit 1909 can also instruct the generation condition acquiring unit 1911 to change the layout conditions when the object of interest is hidden by another frame if the frames are arranged in accordance with the designated layout condition. For example, when the layout condition "layout 3-4" in FIG. 11 in which a low-priority image is superimposed on the upper right corner of the first priority image is designated, an object that matches the reference data (e.g. the portrait image of Jack) may be shown in the very position. In such a case, the generation result judging unit 1909 may instruct the generation condition acquiring unit 1911 to change the layout condition to "layout 3-3".

The generation result judging unit 1909 may be configured to give feedback to the generation condition acquiring unit 1911 only. On the other hand, if the generation result judging unit 1909 gives feedback also to the reference data extracting unit 1604 in the same manner as in the second embodiment, the generation result judging unit 1909 may be configured to determine which of the reference data extracting unit 1604 and the generation condition acquiring unit 1911 the feedback should be sent to.

For example, when only two candidate images are extracted although the layout condition requiring three images is designated, the generation result judging unit 1909 may send feedback to the reference data extracting unit 1604 to correct the reference data to increase the number of candidate images. On the other hand, the generation result judging unit 1909 may send feedback to the generation condition acquiring unit 1911 to change the layout condition to a layout that requires two candidate images.

The generation result judging unit 1909 determines where to send feedback to by comparing the flexibility of the reference data with that of the output video data generation condition. The flexibility of the reference data means whether other related reference data items can be easily added thereto. When a reference data item can be easily added, it is determined that the reference data is flexible.

For example, when the number candidate images can be easily increased by including the text data of Jack's nicknames or the like in the reference data in addition to the text data "Jack" of, the reference data is determined as flexible.

On the other hand, the flexibility of an output video data generation condition means whether the condition can be easily changed to some other output video data generation condition. When the condition can be easily changed, the output video data generation condition is determined as flexible.

For example, when layout conditions of requiring three images and two images are both adoptable in relation to the input constraint, the output video data generation condition corresponding to this constraint is determined as flexible.

The judgment made by use of the history storage unit 1622 is now explained. First, an example of giving feedback on the change of the image selection and combination condition by referring to the history storage unit 1622 is discussed.

It is assumed that the reference data in relation to Jack only is extracted despite the extraction condition that is dynamically updated, and that the same output video data continues to be output for three seconds. Then, the generation result judging unit 1909 makes a judgment on the change of the output video data stored in the history storage unit 1622, and determines that the output video data has not been changed for a certain period of time. Thus, the generation result judging unit 1909 instructs the generation condition acquiring unit 1911 to change the image selection and combination condition to, for example, "select a frame subsequent to the frame used for the output video data in the past".

In this manner, when similar reference data items continue to be input, the generation result judging unit 1909 controls the output video data to be displayed as a still image for three seconds, and then as moving images starting with this still image.

When reference data of Jack and Olivia is continuously given, two images seamlessly combined may be displayed for 30 seconds. In such a case, the generation result judging unit 1909 first makes a judgment on the change of the output video data stored in the history storage unit 1622, and determines that the output video data has not been changed for a certain period of time. Then, the generation result judging unit 1909 instructs the generation condition acquiring unit 1911 to change the image selection and combination condition to, for example, "select an image that includes a typical object regardless of the reference data and seamlessly combine the three images".

In this manner, the image selection and combination condition changes to a condition of seamlessly combining three images, and feedback may be sent to the reference data extracting unit 1604 to add a dog as the typical object to the reference data. In accordance with the updated reference data, an image in which a dog appears, and three images are combined into one composite image.

The image combination condition may be updated at short time intervals such as every 1/30 seconds or every 1/60 seconds. With the updated condition, the images of Jack and Olivia gradually move upward on the composite image, while the image of the dog is gradually inserted to the bottom portion of the composite image. In this manner, a visual effect of the composite image of two images seamlessly changing to the composite image of three images can be created.

An example of providing feedback on a change of the layout condition by referring to the history storage unit 1622 is explained.

For example, when a portrait image of Jack is given as reference data and "layout 3-3" in FIG. 11 is designated, three images of Jack are displayed for one minute. Then, the generation result judging unit 1909 makes a judgment on the changes of the output video data stored in the history storage unit 1622, and determines that the output video data has not been changed for a certain period of time. Thus, the generation result judging unit 1909 instructs the generation condition acquiring unit 1911 to change the layout condition to "layout 4-3", for example.

In this manner, the output video data shown to the user can be dynamically changed. The layout condition may be updated at short time intervals such as every 1/30 seconds or every 1/60 seconds so that the second and third priority images gradually move upward on the display screen, and then the fourth priority image fades in to the bottom portion of the display screen. As a result, a visual effect of "layout 3-3" seamlessly changing to "layout 4-3" can be created. The above example is meant to improve the effectiveness in changing the output video data at the history storage unit 1622 when the output video data would not change very often. In contrast, feedback may be given to the generation condition acquiring unit 1911 in response to a sudden change of the output video data. For example, it is assumed that the output video data is suddenly changed and that the image selection condition is changed from "the frame occupied area priority rule" to "the object quantity priority rule". In such a case, an instruction may be issued to change the image selection condition back to the frame occupied area priority rule. Then, different people continue to be displayed, but the frame occupied area for the person can be maintained. This can reduce the feeling of the atmosphere of the video constantly changing. In addition, when the output video data is suddenly changed, but the layout condition is not at all changed, an instruction to change the layout condition may be issued. Then, the layout can be changed, for example, in accordance with the person who is displayed, and thus the timings of changes can be effectively kept track of.

Figure 21:
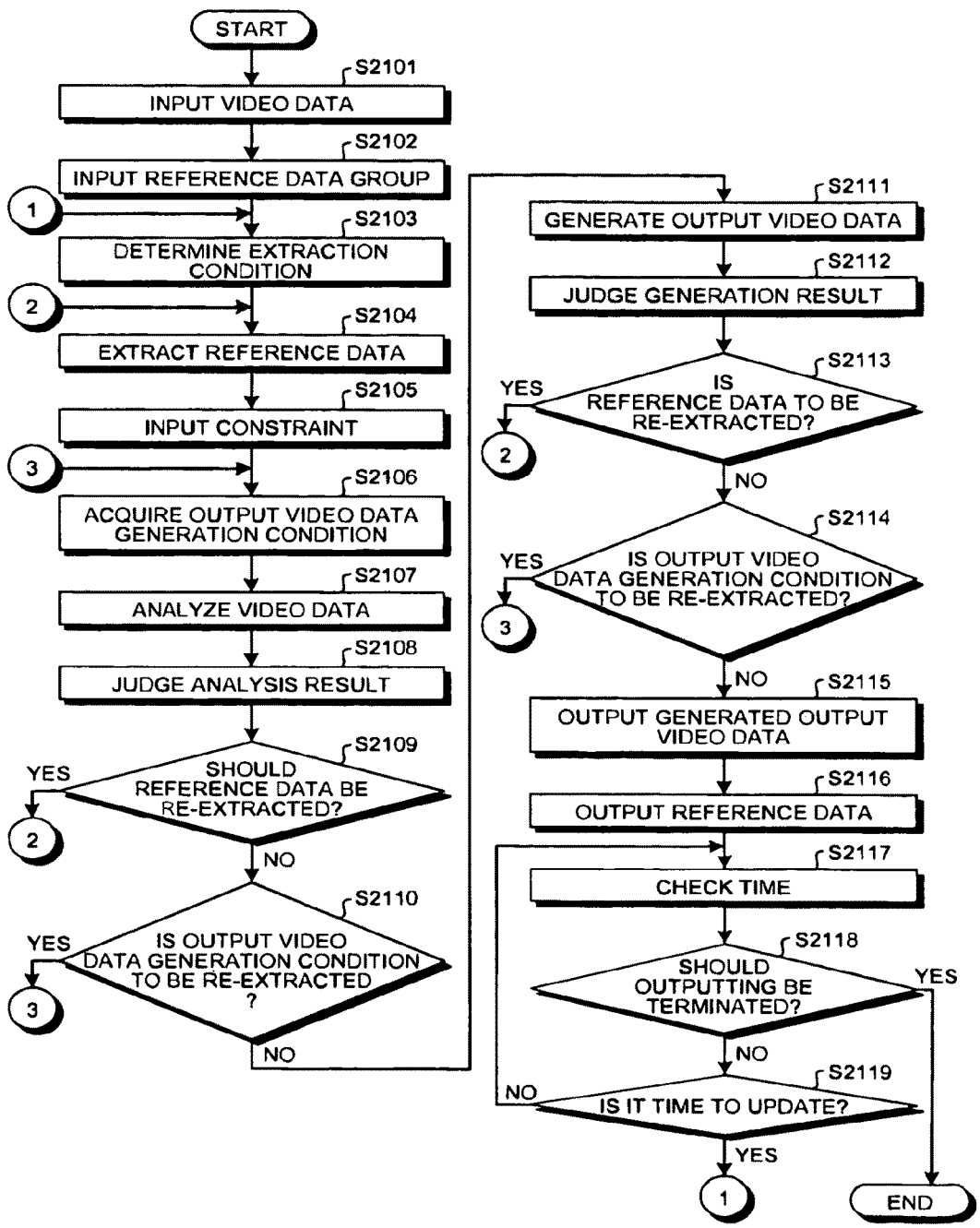
FIG. 21 is a flowchart of a video outputting process according to the third embodiment.

The video outputting process performed by the PC 1900 according to the third embodiment is explained below with reference to FIG. 21.

The processes at steps S2101 through S2104 are the same as steps S1801 through S1804 on the PC 1600 according to the second embodiment, and thus the explanation thereof is omitted.

After the extraction of the reference data, the constraint input unit 1910 inputs constraints such as the size and resolution of the display screen (step S2105). Next, the generation condition acquiring unit 1911 acquires output video data generation conditions that correspond to the input constraints from the association information storage unit 1923 (step S2106).

The video data analyzing process at step S2107 is the same as step S1805 on the PC 1600 according to the second embodiment, and thus the explanation thereof is omitted.

Next, the analysis result judging unit 1908 makes a judgment on the analysis result obtained by the analyzing unit 105 (step S2108). In the same manner as the second embodiment, the analysis result judging unit 1908 first makes a judgment on the consistency of the forms of the reference data and the video data and on the number of candidate images to be included in the output video data. The analysis result judging unit 1908 further determines the genre information of the video data, as discussed above.

Thereafter, the analysis result judging unit 1908 determines whether to re-extract reference data based on the judgment result (step S2109). When the reference data is to be re-extracted (Yes at step S2109), the analysis result judging unit 1908 instructs the reference data extracting unit 1604 to re-extract.

When the reference data is not to be re-extracted (No at step S2109), the analysis result judging unit 1908 determines whether to re-extract output video data generation conditions, based on the judgment result (step S2110). When the output video data generation conditions are to be re-extracted (Yes at step S2110), the analysis result judging unit 1908 instructs the generation condition acquiring unit 1911 to re-extract. Then, the generation condition acquiring unit 1911 executes the process of re-extracting output video data generation conditions in response to the instruction (step S2106).

When output video data generation conditions are not to be re-extracted (No at step S2110), the video generating unit 106 generates output video data in accordance with the output video data generation conditions (step S2111).

Next, the generation result judging unit 1909 makes a judgment on the result of the output video data generated by the video generating unit 106 (step S2112). In the same manner as the second embodiment, the generation result judging unit 1909 determines the quantity and quality of candidate images that are to be included in the output video data. The generation result judging unit 1909 further determines whether the candidate images to be included in the output video data satisfy the output video data generation conditions, as discussed above.

Thereafter, the generation result judging unit 1909 determines whether to re-extract reference data based on the judgment result (step S2113). When the reference data is to be re-extracted (Yes at step S2113), the generation result judging unit 1909 instructs the reference data extracting unit 1604 to re-extract.

When the reference data is not to be re-extracted (No at step S2113), the generation result judging unit 1909 determines whether to re-extract output video data generation conditions, based on the judgment result (step S2114). When output video data generation conditions are to be re-extracted (Yes at step S2114), the generation result judging unit 1909 instructs the generation condition acquiring unit 1911 to re-extract. In response to the instruction, the generation condition acquiring unit 1911 executes the process of re-extracting output video data generation conditions (step S2106).

The processes at steps S2115 through S2119 are the same as steps S1811 through S1815 on the PC 1600 according to the second embodiment. Thus, the explanation thereof is omitted.

The video outputting apparatus according to the third embodiment can select a suitable output video data generation condition from multiple output video data generation conditions in accordance with the input constraint. In this manner, output video data can be generated under various image selection and combination conditions and layout conditions.

According to the third embodiment, the constraint is input, and an output video data generation condition is selected in correspondence with the input constraint. However, the output video data generation condition may be directly input, and the output video data may be generated by use of the output video data generation condition that is input.

Figure 22:
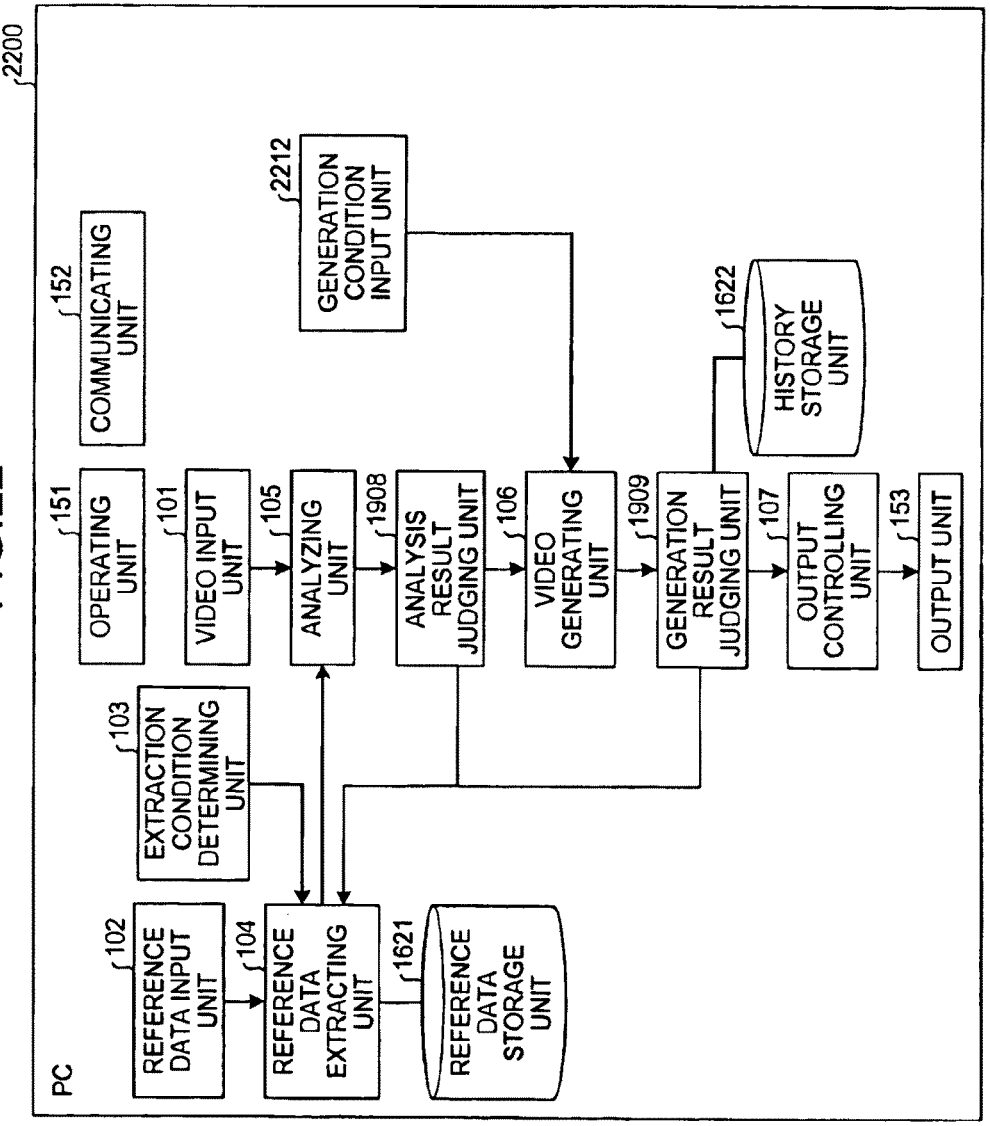
FIG. 22 is a block diagram of an example of a video outputting process modified from the third embodiment.

In a modified example illustrated in FIG. 22, the constraint input unit 1910, the generation condition acquiring unit 1911, and the association information storage unit 1923 are omitted, and a generation condition input unit 2212 is included in place in the PC 2200.

The generation condition input unit 2212 inputs the output video data generation conditions. In accordance with the output video data generation conditions input by the generation condition input unit 2212, the video generating unit 106 generates output video data.

With the above structure, various output video data generation conditions can be input in correspondence with the user's preference by referring to information distributed on the Internet or the like.

The generation condition input unit 2212 in this modified example may be incorporated together with the constraint input unit 1910, the generation condition acquiring unit 1911, and the association information storage unit 1923 according to the third embodiment.

In other words, the method of directly inputting the output video data generation conditions by use of the generation condition input unit 2212 and the method of indirectly designating the output video data generation conditions by use of the constraint input unit 1910 may be adopted together.

In such a case, the input from the generation condition input unit 2212 takes precedence over the input from the constraint input unit 1910. Only for an output video data generation condition that is not input from the generation condition input unit 2212, selection is conducted in accordance with the input from the constraint input unit 1910.

According to a fourth embodiment, the above video outputting apparatus is applied to a purchase system for purchasing a product. The purchase system according to the fourth embodiment displays video data in relation to a product provided by a product provider, performs a product purchasing process in association with the display, and makes a charge incurred by the purchase.

Figure 23:
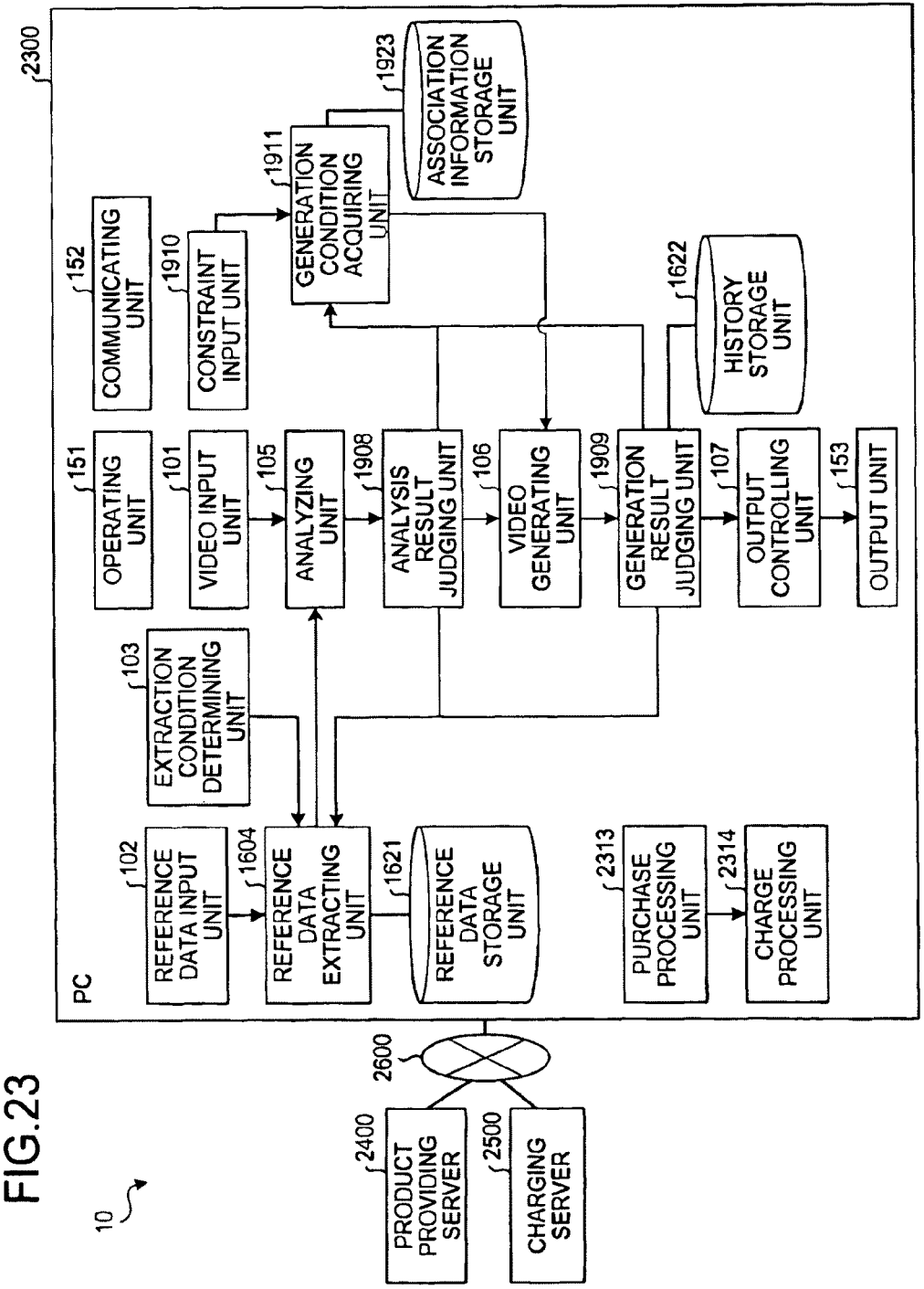
FIG. 23 is a block diagram of a purchase system according to a fourth embodiment.

As illustrated in FIG. 23, a purchase system 10 includes a PC 2300, a product providing server 2400, and a charging server 2500, which are connected by way of a network 2600, such as the Internet.

The product providing server 2400 is a device that manages information in relation to products provided by product providers and has a function of presenting product-related video data. The product providing server 2400 may include a web site on which a product purchase process is executed.

The charging server 2500 is a device that executes a charging process on a product provider when the user of the PC 2300 views the video data provided by the product providing server 2400 and makes a purchase in association with the viewing. For example, the charging server 2500 receives from the PC 2300 information indicating a purchase that is made in association with the viewing of the product-related video data and purchase information including the purchase price. Then, the charging server 2500 charges the product provider a certain percentage of the purchase price by referring to the purchase information.

The PC 2300 displays the video data provided by the product providing server 2400 and executes the product purchase process together in association with the display.

As shown in FIG. 23, the hardware structure of the PC 2300 mainly includes the operating unit 151, the communicating unit 152, the output unit 153, the reference data storage unit 1621, the history storage unit 1622, and the association information storage unit 1923. The software structure of the PC 2300 mainly includes the video input unit 101, the reference data input unit 102, the extraction condition determining unit 103, the reference data extracting unit 1604, the analyzing unit 105, the video generating unit 106, the output controlling unit 107, the analysis result judging unit 1908, the generation result judging unit 1909, the constraint input unit 1910, the generation condition acquiring unit 1911, a purchase processing unit 2313, and a charge processing unit 2314.

The fourth embodiment is differentiated from the third embodiment in the incorporation of the purchase processing unit 2313 and the charge processing unit 2314. The rest of the structure and functions of the fourth embodiment is the same as the PC 1900 according to the third embodiment as illustrated in the block diagram of FIG. 19. The same components are therefore given the same numerals, and the explanation thereof is omitted.

The purchase processing unit 2313 executes a process of purchasing a product displayed in the output video data. For example, when the user selects a purchase of the product by use of the operating unit 151, the purchase processing unit 2313 transmits the information on the quantity of the selected product to the product providing server 2400. The purchase processing unit 2313 may be configured to have the user to input user information necessary for the purchase during the purchase process. If the product providing server 2400 has a web site for executing the purchase process, the purchase processing unit 2313 displays the web site so that the user can go through the purchase procedure.

The charge processing unit 2314 transmits the purchase information including the quantity of products purchased on the purchase processing unit 2313 and the purchase price to the charging server 2500.

The provider of the PC 2300 makes a contract with the product provider in advance, for example, that when the user makes a purchase of a product by use of the purchase processing unit 2313 of the PC 2300, the product provider pays the provider of the PC 2300 a margin as a consideration for leading to product purchase. The charge processing unit 2314 transmits information to the charging server 2500 to charge the product provider the amount in accordance with the contract. The charging server 2500 charges the product provider the amount for the margin with reference to the received information.

The video input unit 101 according the embodiment inputs product-related video data such as advertisement of products provided by product providers. The product providers include administrators of sites for on-line sales or mail-order sales. The reference data input unit 102 inputs a message introducing the products provided by the product providers or the like as a reference data group. The extraction condition determining unit 103 inputs, for example, an extraction condition to designate a text of interest in the product introducing message.

The product video displaying and product purchasing process performed by the PC 1600 according to the fourth embodiment is explained below with reference to FIG. 24.

First, the communicating unit 152 of the PC 2300 receives video data of a product, a reference data group, and an extraction condition from the product providing server 2400 (step S2401). Next, the video outputting process is conducted by use of the received video data, the reference data group, and the extraction condition (step S2402). The video outputting process is the same as the video outputting process according to the third embodiment indicated in FIG. 21.

In response to an instruction from the user, the purchase processing unit 2313 executes the purchase process for the product in association with the displayed output video data (step S2403). When the product is purchased, the charge processing unit 2314 transmits the purchase information of the purchased product to the charging server (step S2404), and terminates the product video displaying and product purchasing process.

Because users have difference preferences, it is difficult for the product provider to produce advertisement video that can be accepted by every user. The video outputting apparatus according to the fourth embodiment displays the video in accordance with data on each user's preference, advertisement video that suits each of the different preferences can be displayed. Hence, the product provider can appeal products more effectively than with the conventional technologies.

Furthermore, the reference data dynamically changes in response to the user's operation of the operating unit. Hence, the user understands the features of products and can easily purchase a product indicated by the displayed video.

The hardware structure of the video outputting apparatus according to the first to the fourth embodiments is explained with reference to FIG. 25.

The video outputting apparatus according to the first to the fourth embodiments includes a control device such as a central processing unit (CPU) 51, memory media such as a read only memory (ROM) 52 and a random access memory (RAM) 53, a communication interface 54 connected to a network to perform communications, external memory devices such as hard disk drive (HDD) and a CD (Compact Disc) drive device, a display device, input devices such as a keyboard and a mouse, and a bus 61 connecting these components to one another. The video outputting apparatus adopts a hardware structure of a regular computer.

The video output program executed by the video outputting apparatus according to the first to fourth embodiments is recorded and provided on a computer-readable recording medium such as a compact disk read only memory (CD-ROM), a flexible disk (FD), a compact disk recordable (CD-R), and a digital versatile disk (DVD) in an installable or executable format.

The video output program executed by the video outputting apparatus according to the first to fourth embodiments may be stored on a computer connected to a network such as the Internet so that it can be downloaded and provided through the network. In addition, the video output program executed by the video outputting apparatus according to the first to fourth embodiments may be offered or distributed through the network such as the Internet.

Alternatively, the video output program according to the first to fourth embodiments may be installed and provided in a ROM or the like in advance.

The video output program executed by the video outputting apparatus according to the first to fourth embodiments has a module structure that includes the units mentioned above (the video input unit, the reference data input unit, the extraction condition determining unit, the reference data extracting unit, the analyzing unit, the video generating unit, the output controlling unit, the analysis result judging unit, the generation result judging unit, the constraint input unit, the generation condition acquiring unit, the purchase processing unit, and the charge processing unit). In reality, the CPU 51 (processor) reads and executes the video output program from the recording medium. Then, each unit is loaded and generated on the main memory device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video outputting apparatus comprising:
a video input unit that inputs video data;
a reference data input unit that inputs a plurality of reference data formed from at least one of image data, text data, and speech data related to the input video data;
a determining unit that determines identification information corresponding to predetermined variable information that changes dynamically and includes an elapsed time elapsed after receipt of an output request of the output video data, from among identification information for the plurality of reference data in accordance with a predetermined rule;
a reference data extracting unit that extracts the reference data corresponding to the identification information determined from the plurality of reference data;
a frame extracting unit that calculates at least one of a level of similarity between frames in the input video data and the image data extracted as the reference data, a level of similarity between text data attached to the frames as metadata and the text data extracted as the reference data, and a level of similarity between speech data attached to the frames and the speech data extracted as the reference data, and extracts a frame whose calculated level of similarity is greater than a predetermined first threshold value or a frame to which speech data whose calculated level of similarity is greater than the first threshold value is attached;

a video generating unit that generates the output video data including the frame extracted by the frame extracting unit; and an output unit that outputs the output video data generated by the video generating unit.

2. The apparatus according to claim 1, further comprising:

an analysis result judging unit that determines which data form the metadata attached to the frame and which data form the extracted reference data, from among forms of image data, text data, and speech data, and determines whether the data form of the metadata matches the data form of the reference data, wherein the reference data extracting unit extracts the reference data that is in data form that matches the data form of the metadata, when the data form of the metadata does not match the data form of the reference data.

3. The apparatus according to claim 1, further comprising:

an analysis result judging unit that determines whether the number of the extracted frames is within a predetermined range, wherein the reference data extracting unit further extracts reference data that is different from the reference data having the determined identification information, when the number of frames is not within a predetermined range.

4. The apparatus according to claim 1, wherein the video generating unit selects a frame of an attribute included in a predetermined generation condition from the extracted frames, based on the generation condition defining the attribute of the frames that are to be included in the output video data and an output mode, and generates the output video data that outputs the selected frames in the output mode included in the generation condition.

5. The apparatus according to claim 4, further comprising:

a generation result judging unit that determines whether the extracted frames include the frame of the attribute and/or whether the extracted frames include a frame that can be output in the output mode, wherein the reference data extracting unit further extracts reference data that is different from the reference data having the determined identification information, when the extracted frames do not include the frame of the attribute and/or when the extracted frames do not include the frame that can be output in the output mode.

6. The apparatus according to claim 1, wherein the frame extracting unit further calculates at least one of a level of similarity between the frames in the input video data and frames included in the output video data, or a level of similarity between the speech data attached to the frames and speech data attached to the frames included in the output video data, and extracts a frame whose calculated level of similarity is greater than the first threshold value or the frame to which speech data whose calculated level of similarity is greater than the first threshold value is attached.

7. The apparatus according to claim 1, further comprising:

a history storage unit that stores the output video data every time the output video data is generated; and a generation result judging unit that determines a level of similarity between output video data newly generated by the video generating unit and the output video data stored in the history storage unit, and determines whether the calculated level of similarity is greater than a predetermined second threshold value, wherein the reference data extracting unit further extracts reference data that is different from the reference data having the determined identification information, in accordance with a comparison between the calculated level of similarity and the second threshold value.

8. The apparatus according to claim 1, further comprising:

a reference data storage unit that stores the reference data in association with other items of the reference data related thereto, wherein the reference data extracting unit further extracts the other reference data related to the extracted reference data, from the reference data storage unit.

9. The apparatus according to claim 1, further comprising:

an association information storage unit that stores association information in which a predetermined generation condition defining an attribute of the frames to be included in the output video data and an output mode is associated with a predetermined constraint condition relating to a viewing situation of the output video data;

a constraint input unit that inputs the constraint condition; and a generation condition acquiring unit that acquires the generation condition corresponding to the input constraint condition, from the association information storage unit, wherein the video generating unit selects a frame of the attribute included in the acquired generation condition from the extracted frames, and generates the output video data to output the selected frames in the output mode included in the acquired generation condition.

10. The apparatus according to claim 9, further comprising:

an analysis result judging unit that analyzes the extracted frames and acquires the constraint condition relating to the frames, wherein the generation condition acquiring unit further acquires the generation condition corresponding to the acquired constraint condition from the association information storage unit.

11. The apparatus according to claim 9, further comprising:

a generation result judging unit that determines whether the extracted frames include the frame of the attribute included in the acquired generation condition and/or whether the extracted frames include the frame that can be output in the output mode included in the acquired generation condition, wherein the generation condition acquiring unit acquires from the association information storage unit a generation condition that is different from the acquired generation condition, when the extracted frames do not include the frame of the attribute and/or when the extracted frames do not include the frame that can be output in the output mode.

12. The apparatus according to claim 9, further comprising:

a history storage unit that stores the output video data each time the output video data is generated; and a generation result judging unit that calculates a level of similarity between output video data that is newly generated by the video generating unit and the output video data stored in the history storage unit, and determines whether the calculated similarity is greater than a predetermined third threshold value, wherein the generation condition acquiring unit further acquires from the association information storage unit the generation condition corresponding to a constraint condition that is different from the obtained constraint condition, in accordance with a comparison between the calculated level of similarity and the third threshold value.

13. The apparatus according to claim 1, further comprising:
a generation condition input unit that inputs a predetermined generation condition defining an attribute of the frames that are to be included in the output video data and an output mode, wherein
the video generating unit selects a frame of the attribute included in the input generation condition from the extracted frames, and generates the output video data that outputs the selected frame in the output mode included in the input generation condition.

14. The apparatus according to claim 1, wherein the output unit further outputs the extracted reference data and the generated output video data, in association with each other.

15. The apparatus according to claim 1, wherein
the output unit further displays the identification information in a designatable manner;
the apparatus further comprises an operating unit that designates at least one item of the identification information displayed by the output unit; and
the determining unit determines the item of the identification information designated by the operating unit as the identification information of the reference data that is to be extracted.

16. The apparatus according to claim 1, wherein
the video outputting apparatus is connected via network to a providing apparatus that provides video data related to a product and a charging apparatus that executes a charging process onto a provider of the product in accordance with purchase information of the purchased product;
the video input unit inputs the video data related to the product from the providing apparatus; and
the video outputting apparatus further comprises:
a purchase processing unit that executes a process relating to a purchase of the product designated with reference to the output video data output by the output unit; and
a charging processing unit that transmits to the charging apparatus the purchase information related to the product purchased on the purchase processing unit.

17. A video outputting method performed in a video outputting apparatus, the method comprising:
inputting video data;
inputting a plurality of reference data formed from at least one of image data, text data, and speech data related to the input video data;
determining identification information corresponding to predetermined variable information that changes dynamically and includes an elapsed time elapsed after receipt of an output request of the output video data, from among identification information for the plurality of reference data in accordance with a predetermined rule;
extracting the reference data corresponding to the identification information determined from the plurality of reference data;
calculating at least one of a level of similarity between frames in the input video data and the image data extracted as the reference data, a level of similarity between text data attached to the frames as metadata and the text data extracted as the reference data, and a level of similarity between speech data attached to the frames and the speech data extracted as the reference data;
extracting a frame whose calculated level of similarity is greater than a predetermined first threshold value or a frame to which speech data whose calculated level of similarity is greater than the first threshold value is attached;
generating the output video data including the extracted frame; and
outputting the generated output video data.

18. A purchasing system comprising:
a providing apparatus that provides video data related to a product;
a charging apparatus that executes a charging process onto a provider of the product in accordance with purchase information of the purchased product; and
a video outputting apparatus that generates and outputs output video data including frames extracted from input video data, wherein
the video outputting apparatus includes
a video input unit that inputs video data,
a reference data input unit that inputs a plurality of reference data formed from at least one of image data, text data, and speech data related to the input video data,
a determining unit that determines identification information corresponding to predetermined variable information that changes dynamically and includes an elapsed time elapsed after receipt of an output request of the output video data, from among identification information for the plurality of reference data in accordance with a predetermined rule,
a reference data extracting unit that extracts the reference data corresponding to the identification information determined from the plurality of reference data,
a frame extracting unit that calculates at least one of a level of similarity between frames in the input video data and the image data extracted as the reference data, a level of similarity between text data attached to the frames as metadata and the text data extracted as the reference data, and a level of similarity between speech data attached to the frames and the speech data extracted as the reference data, and extracts a frame whose calculated level of similarity is greater than a predetermined first threshold value or a frame to which speech data whose calculated level of similarity is greater than the first threshold value is attached,
a video generating unit that generates the output video data including the frame extracted by the frame extracting unit,
an output unit that outputs the output video data generated by the video generating unit,
a purchase processing unit that executes a process relating to a purchase of the product designated with reference to the output video data output by the output unit, and
a charging processing unit that transmits to the charging apparatus the purchase information related to the product purchased on the purchase processing unit.

* * * * *